(12) United States Patent
Valenta

(10) Patent No.: US 11,754,098 B2
(45) Date of Patent: Sep. 12, 2023

(54) VALVE STRUCTURE FOR DRIVING REVERSIBLE PLOUGHS

(71) Applicant: Oleodinamica Marchesini S.p.A., Prevalle (IT)

(72) Inventor: Robert Jonathan Valenta, Desenzano del Garda (IT)

(73) Assignee: Oleodinamica Marchesini S.p.A., Prevalle (IT)

( * ) Notice: Subject to any disclaimer, the term of this patent is extended or adjusted under 35 U.S.C. 154(b) by 0 days.

(21) Appl. No.: 17/531,973

(22) Filed: Nov. 22, 2021

(65) Prior Publication Data

US 2022/0163055 A1 May 26, 2022

(30) Foreign Application Priority Data

Nov. 25, 2020 (EP) ................................. 20425053

(51) Int. Cl.
| | |
|---|---|
| F15B 11/20 | (2006.01) |
| F15B 15/14 | (2006.01) |
| F15B 1/26 | (2006.01) |
| F16K 11/22 | (2006.01) |

(52) U.S. Cl.
CPC ............ F15B 15/1409 (2013.01); F15B 1/26 (2013.01); F16K 11/22 (2013.01)

(58) Field of Classification Search
CPC ........ F15B 13/07; F15B 1/26; F15B 15/1409; F16K 11/22; A01B 3/464; A01B 15/00
See application file for complete search history.

(56) References Cited

FOREIGN PATENT DOCUMENTS

| CN | 108679022 B | 7/2020 |
|---|---|---|
| EP | 0890748 A1 | 1/1999 |

OTHER PUBLICATIONS

European Search Report dated May 7, 2021, issued in connection with European Patent Application No. 2042505.3.

*Primary Examiner* — Kenneth Bomberg
*Assistant Examiner* — Daniel S Collins
(74) *Attorney, Agent, or Firm* — Akerman LLP

(57) ABSTRACT

A valve structure (1) for driving reversible ploughs (40), comprising a first port (3) adapted to be in fluid communication with a pump (P) in a first configuration of the plough (40) and adapted to be in fluid communication with a tank (T) in a second reversed configuration of the plough (40), and a second port (4) adapted to be in fluid communication with the tank (T) in the first configuration of the plough (40) and adapted to be in fluid communication with the pump (P) in the second reversed configuration of the plough (40), a body (2) which includes a first seat (5) and a second seat (6), the seats housing respective moving spools (13, 14), a first interconnection port (7a) for the connection of the valve structure (1) to a first chamber (10a) of a first hydraulic cylinder (10) for longitudinally aligning the plough (40), and a second interconnection port (7b) for the connection to a second chamber (10b) of the first hydraulic cylinder (10), a third interconnection port (8a) for the connection of the valve structure (1) to a first chamber (12a) of a second hydraulic cylinder (12) for reversing the plough (40), and a fourth interconnection port (8b) for the connection to a second chamber (12b) of the second hydraulic cylinder (12). The valve structure (1) comprises hydraulic components configured to control the relative displacement of the spools (13, 14) to automatically control the movement of the cylinders (10, 12). A check valve (31) enables the fluid to flow in the second reversed configuration of the plough (40).

18 Claims, 24 Drawing Sheets

VALVE STRUCTURE FOR DRIVING REVERSIBLE PLOUGHS

CROSS-REFERENCE TO RELATED APPLICATIONS

The present application claims priority to European Patent Application No. 20425053.4, filed on Nov. 25, 2020, the entirety of which is incorporated herein by reference.

BACKGROUND

Field of the Application

The present disclosure refers to a valve structure for driving reversible ploughs, and more in particular for driving hydraulic cylinders for the alignment and the rotation of reversible ploughs. The following description is made with reference to this application field with the only purpose of simplifying the exposition thereof.

Description of the Related Art

Reversible ploughs are widely used for loosening or turning the soil before sowing seed or planting. Specifically, a reversible plough comprises two sets of working tools which are opposed to each other and symmetrically arranged at 180° on the same beam.

In a reversible plough, the two sets of tools work alternately: when one set is used, the other is raised above the ground surface. The reversible plough allows turning the soil to the right or to the left, with respect to the direction of advancement of the tractor, according to the tool used; in order to change the soil turning direction, a 180° rotation of plough is carried out.

According to past solutions, the rotation was carried out mechanically by means of springs. This solution has many drawbacks, in particular due to the frequent jams of the springs, which are not able to perform said rotation in case of very heavy ploughs.

In order to avoid these drawbacks, hydraulic cylinders are used, said cylinders being driven by valves.

Multiple-furrow ploughs are currently widely used: these ploughs comprise a plurality of working tools which are parallel to each other and offset from each other with respect to the forward direction, so as to trace as many furrows in a single passage. As the number of working tools increases, the length of the plough increases.

For this reason, two hydraulic cylinders are used, one being adapted to longitudinally align the plowshares with respect to the forward direction of the tractor and the other being adapted to rotate the plough.

Before turning the plough, the plowshares have to be longitudinally aligned; for this reason, valves are used to control both hydraulic cylinders according to a predetermined working sequence.

In some known solutions, the proper sequence of operation is ensured by partializing the work fluid in the valves, which solutions have some drawbacks. A better control of the plough operation is thus desired.

Moreover, in many cases, the control mechanism of the plough does not allow the reverse operation thereof.

Therefore, it is desirable to provide a valve structure having structural and functional features such as to allow overcoming the limitations and drawbacks still affecting the known solutions, in particular able to easily control and drive the plough operation, ensuring also an efficient reverse operation thereof.

SUMMARY OF THE DISCLOSURE

The present disclosure provides a valve structure for driving the hydraulic cylinders of a reversible plough to obtain the automatic oil backflow and therefore the automatic reversal of the movement of said cylinders. The alignment cylinder and the overturning cylinder work in parallel. First the alignment cylinder starts lining up the load, and then the overturning cylinder starts rotating the plough. Once it passed the standoff position (i.e. 90°), the movement of the cylinders is inverted. The proper working sequence is ensured by the presence of two moving spools whose relative position determines a particular flow path of the work-fluid: therefore, a particular relative position of the spools corresponds to a particular step in the working sequence. The relative position of the spools is determined by a suitably designed hydraulic circuit, which is configured to control the work-fluid flow and pressure at specific locations of the valve structure for moving the spools, wherein the specific working sequence is controlled by the presence of relief valves in the hydraulic circuit whose opening or closure determines a specific flow path and thus the execution of a particular step in the working sequence. The presence of a check valve arranged between the tank and the overturning cylinder enables a safe reverse operation of the plough, allowing the passage of the return flow in said reverse operation.

More in particular, an exemplary valve structure of the disclosure is the valve structure according to claim 1. More in particular, an exemplary valve structure for driving reversible ploughs comprises:

a first port adapted to be in fluid communication with a pump in a first configuration of the plough and adapted to be in fluid communication with a tank in a second reversed configuration of the plough, and a second port adapted to be in fluid communication with the tank in the first configuration of the plough and adapted to be in fluid communication with the pump in the second reversed configuration of the plough;

a body which includes a first seat and a second seat;

a first interconnection port for the connection of the valve structure to a first chamber of a first hydraulic cylinder for longitudinally aligning the plough, and a second interconnection port for the connection to a second chamber of the first hydraulic cylinder;

a third interconnection port for the connection of the valve structure to a first chamber of a second hydraulic cylinder for reversing the plough, and a fourth interconnection port for the connection to a second chamber of the second hydraulic cylinder; and a hydraulic sequencing circuit comprising:

a first spool slidingly housed in the first seat, and a second spool slidingly housed in the second seat, the first spool and second spool being configured to control the work-fluid passage between the pump, the first seat, the second seat, the first hydraulic cylinder, the second hydraulic cylinder and the tank in order to control the actuation of the first hydraulic cylinder and the second hydraulic cylinder according to a work sequence;

a relief valve adapted to be in fluid communication with the first cylinder and with the second cylinder, the relief valve being configured to determine at least part of said working sequence;

at least a first connection duct and a second connection duct connecting portions of the first seat and the second seat to each other;

a third connection duct adapted to connect the second hydraulic cylinder and the pump in the first configuration, and adapted to connect the second hydraulic cylinder and the tank in the second reversed configuration, i.e. adapted to connect the first port to the second hydraulic cylinder; and a check valve arranged in the third connection duct and configured to allow the work-fluid to flow from the second hydraulic cylinder to the tank in the second reversed configuration of the plough and to block the work-fluid in the first configuration of the plough, wherein the hydraulic sequencing circuit is configured such that, in the first configuration:

when the work-fluid is fed to the first port, the first spool and the second spool are at an initial operating position such that the fluid is supplied via the first interconnection port into the first chamber of the alignment cylinder to extend the first hydraulic cylinder;

when the first hydraulic cylinder is fully extended and no work-fluid is discharged from the second chamber thereof, the first spool and the second spool are displaced relative to each other so that the work-fluid is supplied via the fourth interconnection port to the second chamber of the second hydraulic cylinder, retracting the second hydraulic cylinder;

when the second hydraulic cylinder reaches the end of the stroke and no work-fluid is discharged from the first chamber thereof, the first spool and the second spool are displaced relative to each other so that the work-fluid from the pump is supplied via the third interconnection port to the first chamber of the second hydraulic cylinder, extending the second hydraulic cylinder; and when the second hydraulic cylinder reaches the end of the stroke and no work-fluid is discharged from the second chamber thereof, the work-fluid from the pump is supplied via the second interconnection port to the second chamber of the first hydraulic cylinder, retracting the first hydraulic cylinder to complete the alignment of the plough, wherein the hydraulic sequencing circuit is configured such that, in the second reversed configuration, when the work-fluid is fed to the second port, it is supplied into the first chamber of the second hydraulic cylinder and then the work-fluid exiting from the second chamber passes through the third connection duct via the check valve and then returns to the tank.

Even more particularly, the valve structure according to the present disclosure comprises the following additional characteristics, taken individually or in combination if required.

According to an aspect of the present disclosure, the hydraulic sequencing circuit may be configured such that, in the first configuration:

when the work-fluid is fed to the first port, the first spool and the second spool are at the initial operating position such that the work-fluid passes at least through the first spool and the first interconnection port to be supplied into the first chamber of the alignment cylinder, the fluid from the second chamber of the first hydraulic cylinder flowing through the second interconnection port, the relief valve, the first connection duct, and then returning to the tank;

when the first hydraulic cylinder is fully extended and no work-fluid is discharged from the second chamber thereof, the first spool and the second spool are displaced relative to each other so that the work-fluid is allowed to pass via the second connection duct from the first spool to the second spool and then is supplied to the second chamber of the second hydraulic cylinder via the fourth interconnection port;

when the second hydraulic cylinder reaches the end of the stroke and no work-fluid is discharged from the first chamber thereof, the first spool and the second spool are displaced relative to each other so that the work-fluid from the pump is allowed to pass, through the second connection duct, from the first spool to the second spool and then is supplied to the first chamber of the second hydraulic cylinder via the third interconnection port; and when the second hydraulic cylinder reaches the end of the stroke and no work-fluid is discharged from the second chamber thereof, the work-fluid from the pump is allowed to pass through the first spool, the second spool, the relief valve and then is supplied to the second chamber of the first hydraulic cylinder via the second interconnection port.

According to an aspect of the present disclosure, the valve structure may comprise a first restrictor at the first spool, the first restrictor being arranged and configured so that, in the first configuration when the first spool and the second spool are at the initial operating position, the work-fluid from the pump passes through the first restrictor in the first spool before entering the first chamber of the first hydraulic cylinder.

According to an aspect of the present disclosure, the valve structure may comprise a second restrictor arranged in parallel to the first connection duct and configured to cause a pressure drop of the work-fluid passing therethrough and to cause a pressure increase in portions of the first seat and of the second seat in fluid connection with the first connection duct, the first spool and the second spool being configured to be moved from their initial operating position by the work-fluid in these portions in such a way that the relative position of the first spool and the second spool enables the work-fluid from the pump to pass through the first spool toward the first chamber of the first hydraulic cylinder without passing through the first restrictor.

According to an aspect of the present disclosure, the first seat may comprise a plurality of containment chambers arranged side by side, and the second seat comprises a plurality of corresponding containment chambers arranged side by side.

According to an aspect of the present disclosure, the containment chambers of the first seat may include a first end containment chamber and a second end containment chamber opposed to each other along a longitudinal axis of the first seat, and the containment chambers of the second seat may include a first end containment chamber and a second end containment chamber opposed to each other along a longitudinal axis of the second seat, the first connection duct being arranged between the first end containment chamber of the first seat and the corresponding first end containment chamber of the second seat, the first end containment chambers of the first seat and of the second seat being the portions of the first seat and of the second seat adapted to house the pressure fluid for moving the first spool and the second spool from their initial operating position.

According to an aspect of the present disclosure, the first seat may comprise a central containment chamber and intermediate containment chambers arranged between the end containment chambers and the central containment chamber, and the second seat may comprise a central containment chamber and intermediate containment chambers arranged between the end containment chambers and the central containment chamber, the second connection duct being arranged between one of the intermediate containment chambers of the first seat and the central containment chamber of the second seat.

According to an aspect of the present disclosure, the first spool may comprise two housing seats at the opposite end thereof, and the second spool may comprise two housing seats at the opposite end thereof, those seats housing spring members for controlling the movement of the first spool and the second spool.

According to an aspect of the present disclosure, the housing seats of the first spool may be configured to receive the work-fluid from the end containment chambers of the first seat, and the housing seats of the second spool may be configured to receive the work-fluid from the end containment chambers of the second seat.

According to an aspect of the present disclosure, the valve structure may further comprise a third restrictor which is arranged in the flow path between the second port and the first seat and is configured to cause a pressure drop of the work-fluid passing therethrough and to cause a pressure increase in a portion of the first seat in fluid connection with this third restrictor, the first spool being configured to be moved by the work-fluid in this portion in an opposite direction with respect to the motion caused by the second restrictor, enabling the work-fluid to flow from the first spool to the second spool.

According to an aspect of the present disclosure, the portion of the first seat in fluid connection with the third restrictor and housing the pressurized work-fluid may be the second end containment chamber of the first seat, the third restrictor being configured in such a way that the pressure of the work-fluid in the second end containment chamber is increased to cause the movement of the first spool.

According to an aspect of the present disclosure, the valve structure may further comprise a fourth restrictor which is arranged between the second port and the second seat and configured to cause a pressure drop of the work-fluid passing therethrough and to cause a pressure increase in a portion of the second seat in fluid connection with the fourth restrictor, the second spool being configured to be moved by the work-fluid in this portion in an opposite direction than the motion caused by the second restrictor to allow the work-fluid to flow from the pump to the first chamber of the second alignment cylinder.

According to an aspect of the present disclosure, the portion of the second seat in fluid connection with the fourth restrictor and housing the pressurized work-fluid may be the second end containment chamber of the second seat, the fourth restrictor being configured in such a way that the pressure of the work-fluid in the second end containment chamber is increased to cause the movement of the second spool.

According to an aspect of the present disclosure, the valve structure may further comprise a check valve arranged in parallel to the fourth restrictor and configured to allow the passage of return flow for pressure values ranging from 2 to 10 bar, preferably 4 bar.

According to an aspect of the present disclosure, the valve structure may further comprise another check valve arranged in parallel to the third restrictor and configured to allow the passage of the return flow for pressure values ranging from 2 to 10 bar, preferably 8 bar.

According to an aspect of the present disclosure, the relief valve may have a secondary area configured in such a way that, in the first configuration, the work-fluid which is discharged from the second chamber of the first hydraulic cylinder flows through the second interconnection port and then from an outlet to an inlet of the relief valve.

According to another aspect of the present disclosure, in the first configuration when the second hydraulic cylinder reaches the end of the stroke and no work-fluid is discharged from the second chamber thereof, the pressure of the work-fluid may be such that the relief valve is opened allowing fluid passage from the inlet to the outlet thereof, the secondary area of the relief valve being configured so that the pressure in the second chamber of the first hydraulic cylinder holds the relief valve opened.

According to an aspect of the present disclosure, the valve structure may comprise a first duct adapted to connect the first interconnection port with the first seat, a second duct adapted to connect the second interconnection port with the outlet of the relief valve, a third duct adapted to connect the third interconnection port with the inlet of the relief valve, and a forth duct adapted to connect the fourth interconnection port and the second seat.

According to an aspect of the present disclosure, the valve structure may comprise a relief valve arranged in the return path between the first chamber of the first hydraulic cylinder and the second port, this relief valve being configured such that, in the first configuration, when the first hydraulic cylinder reaches the end of the stroke and no fluid is displaced from the second chamber, it is in an open state.

According to an aspect of the present disclosure, the valve structure may comprise a further relief valve arranged in the return path between the second chamber of the second hydraulic cylinder and the second port, this relief valve being configured such that, in the first configuration, when the second hydraulic cylinder reaches the end of the stroke and no fluid is discharged from the first chamber thereof, it is in an open state.

According to an aspect of the present disclosure, the first spool may comprise a notch formed thereon and configured to provide the proper timing to allow the first spool to maintain the position allowing, in the first configuration, the work-fluid to flow from the pump, through the first spool, the second spool, and to be supplied to the second hydraulic cylinder to perform the rotation of the plough.

According to another aspect of the present disclosure, the second spool may comprise a notch configured to provide the proper timing to allow the second spool to maintain the position allowing, in the first configuration, the work-fluid to flow from the pump, through the first spool, the second spool, the relief valve, and to be supplied to the first hydraulic cylinder to complete the alignment of the plough.

The features and advantages of the valve structure according to the disclosure will become apparent from the following description of an embodiment thereof, given by way of non-limiting example with reference to the accompanying drawings.

DETAILED DESCRIPTION

With reference to those figures, a valve structure according to the present disclosure is globally and schematically indicated with 1.

It is worth noting that the figures represent schematic views and are not drawn to scale, but instead they are drawn so as to emphasize the important features of the disclosure. Moreover, in the figures, the different elements are depicted in a schematic manner, their shape varying depending on the application desired. It is also noted that in the figures the same reference numbers refer to elements that are identical in shape or function. Finally, particular features described in relation to an embodiment illustrated in a figure are also applicable to the other embodiments illustrated in the other figures.

It is also noted that, when sequences of process steps are illustrated, they do not necessarily follow the indicated sequence, and these steps may be inverted unless the opposite is expressly indicated.

Figure 1:
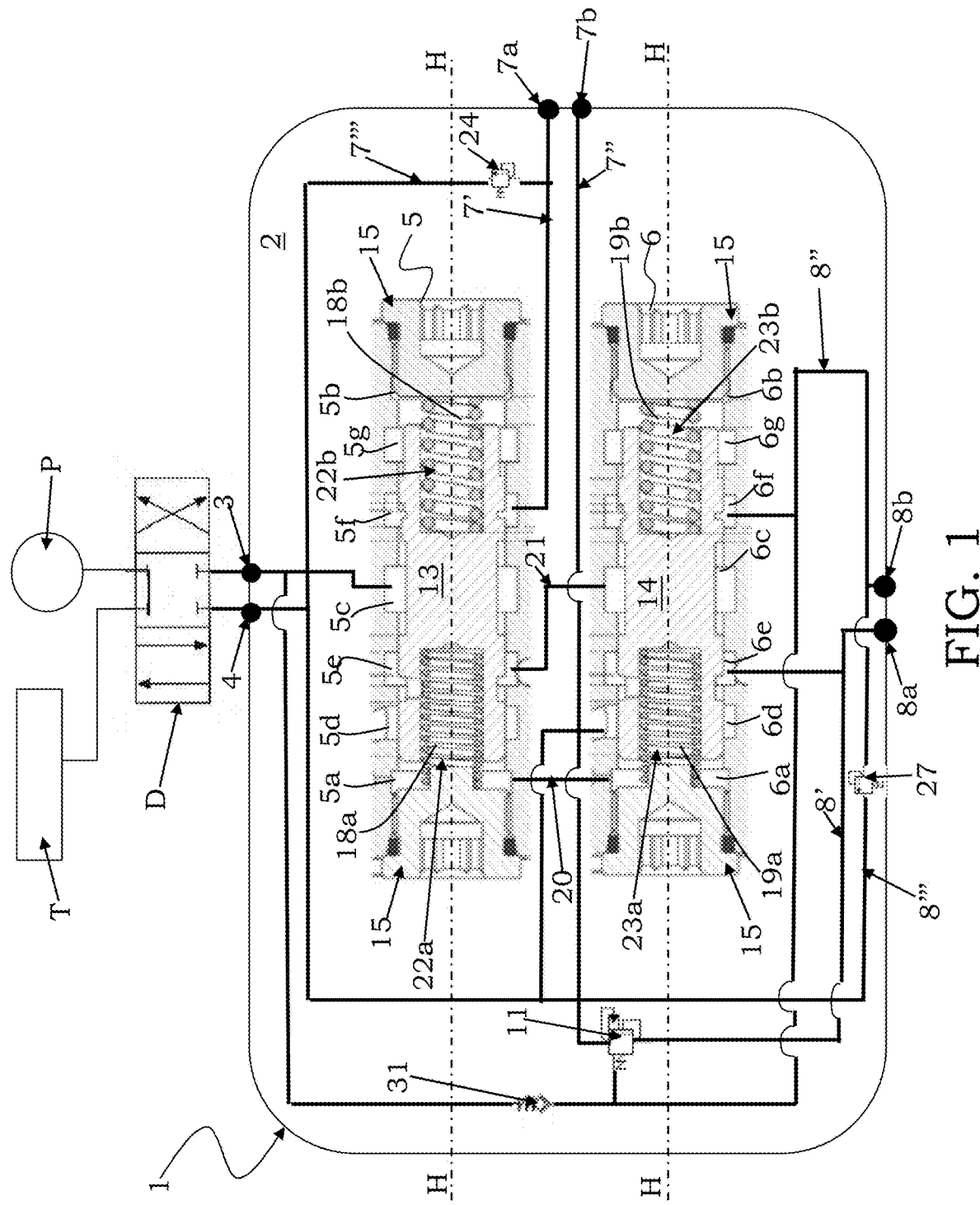
FIG. 1 is a simplified sectional view of a valve structure for driving reversible ploughs according to the present disclosure.
Figure 2A:
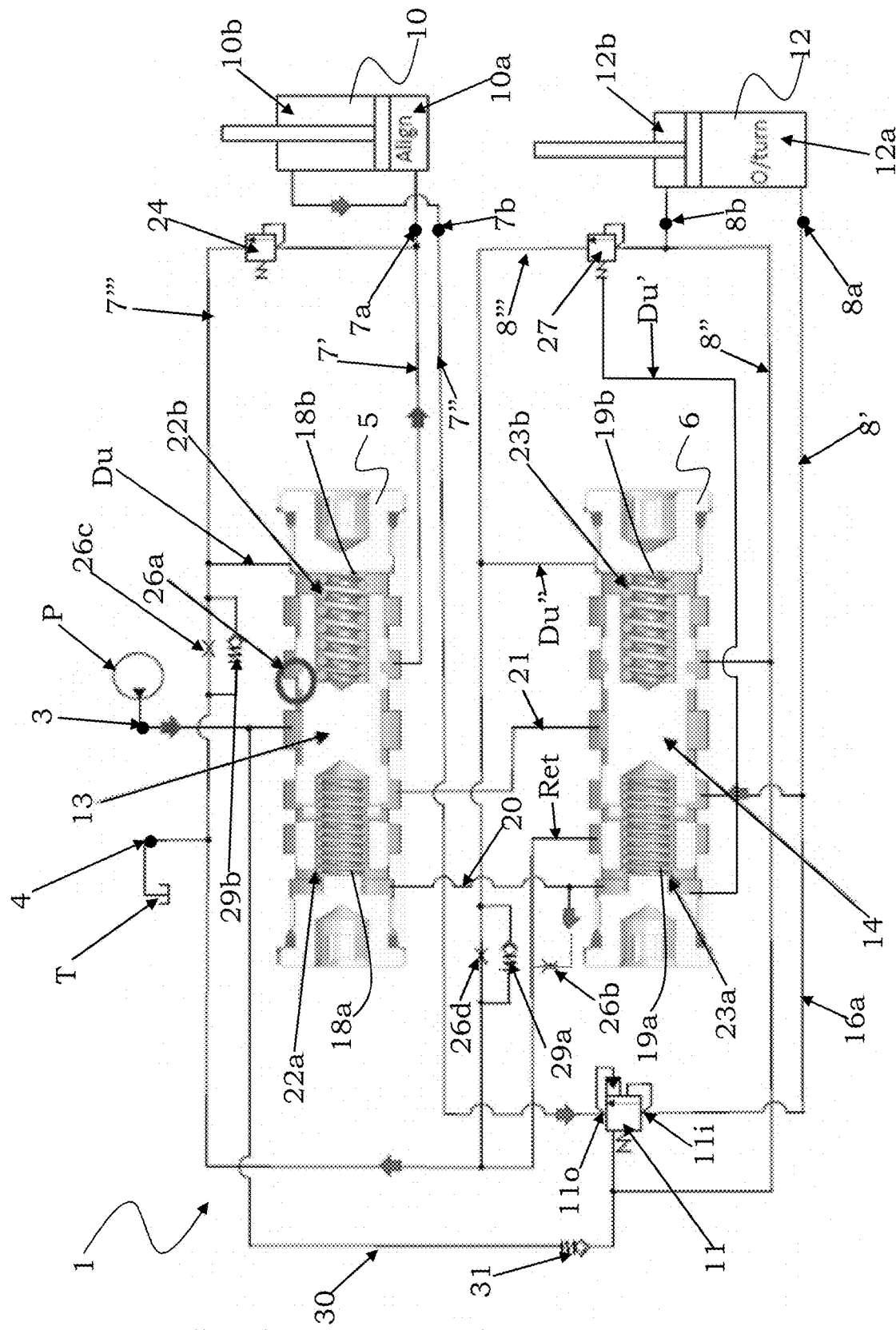
FIG. 2A shows a sectional view of the valve structure of the present disclosure and the main connections thereof according to a first step of the plough operation.

It is also observed that all the components of the disclosure are highlighted in FIGS. 1 and 2A, while the other figures show only the references for the relevant features disclosed in relation with said figures.

Clearly, some technical details of the disclosure can be replaced by other technically equivalent details without departing from the claimed protection scope, as the skilled man well knows.

The valve structure 1 of the present disclosure is applied to drive hydraulic cylinders for aligning and rotating reversible ploughs, preferably multiple-furrow reversible ploughs.

As shown in FIG. 1, the valve structure 1 comprises a body 2 adapted to receive and house the work-fluid, for instance hydraulic oil. The body 2 includes the main components of the valve structure 1.

According to an embodiment of the present disclosure, the body 2 of the valve structure 1 is made of zinc-plated steel and the internal components are made of hardened and ground steel, even if other suitable materials can be used and the present disclosure is not limited by the materials used.

In the usual operating configuration of the plough, the alignment cylinder is retracted, and the overturning cylinder is extended. This operating configuration can be automatically obtained by a working sequence of the valve structure 1 which is disclosed in the following. Moreover, the valve structure 1 of the present disclosure also enables a reverse configuration of the plough movement, which is started for instance after adjusting mechanical components of the plough.

The valve structure 1 comprises a first port 3 which is adapted to receive the work-fluid from a pump P, and a second port 4 adapted to be in fluid communication with the tank T. In the usual operating configuration of the plough, the first port 3 can be called input port and the second port 4 can be called return port.

The body 2 of the valve structure 1 includes a first seat 5 and a second seat 6 which extend longitudinally along a longitudinal axis H-H. More in particular, the first seat 5 and the second seat 6 extend along respective longitudinal axis H-H which are substantially parallel to each other.

More in particular, as shown in FIG. 1, the first seat 5 and the second seat 6 comprise a respective cavity closed axially by respective closure bodies 15 (such as suitable plugs).

According to an embodiment of the present disclosure, the first seat 5 comprises a plurality of containment chambers (herein indicated with references 5a, 5b, 5c, 5d, 5e, 5f, 5g) arranged side by side, and the second seat comprises a plurality of corresponding containment chambers (herein indicated with references (6a, 6b, 6c, 6d, 6e, 6f, 6g) arranged side by side, said containment chambers being adapted to receive the work-fluid and being in a selective fluid communication with each other due to the presence of two spools in the seats 5 and 6, as it will be disclosed in the following. Each step of the working sequence of the valve structure 1 corresponds to different containment chamber housing the work-fluid. More in particular, in a preferred embodiment of the present disclosure, the containment chambers have an annular shape.

According to an embodiment, the containment chambers of the first seat 5 include a first end containment chamber 5a and a second end containment chamber 5b opposed to each other along the longitudinal axis H-H of said first seat 5, and the containment chambers of the second seat 6 include a first end containment chamber 6a and a second end containment chamber 6b opposed to each other along the longitudinal axis H-H of said second seat 6. In other words, the first seat 5 extends between the first and second end containment chambers 5a and 5b, and the second seat 6 extends between the first and second end containment chambers 6a and 6b along the longitudinal axis H-H.

Furthermore, in an embodiment, the first seat 5 comprises a central containment chamber 5c and intermediate containment chambers 5d, 5e, 5f, 5g, said intermediate containment chambers being arranged between the end containment chambers 5a, 5b and the central containment chamber 5c. Likewise, the second seat 6 comprises a central containment chamber 6c and intermediate containment chambers 6d, 6e, 6f, 6g said intermediate containment chambers being arranged between the end containment chambers 6a, 6b and the central containment chamber 6c. Obviously, this configuration is only indicative and the figures are not limiting the scope of the present disclosure, the arrangement of the chambers being variable according to the needs or circumstances.

The first seat 5 is connected to the first port 3, in particular through the central containment chamber 5c.

As mentioned before, the valve structure 1 is able to control the movement of two hydraulic cylinders of a reversible plough: a first hydraulic cylinder 10 for aligning the plough (also called alignment cylinder 10) and a second hydraulic cylinder 12 for rotating the plough (also called overturning cylinder 12). At this regard, the valve structure 1 comprises a first interconnection port 7a for the connection of the valve structure 1 to a first chamber 10a of the first hydraulic cylinder 10, and a second interconnection port 7b for the connection to a second chamber 10b of said first hydraulic cylinder 10. The first chamber 10a is indicated also as head chamber 10a and the second chamber 10b is indicated also as rod chamber 10b.

Moreover, the valve structure 1 comprises a third interconnection port 8a for the connection of said valve structure 1 to a first chamber 12a of the second hydraulic cylinder 12 for reversing the plough, and a fourth interconnection port 8b for the connection to a second chamber 12b of said second hydraulic cylinder 12. As seen before, the first chamber 12a is indicated also as head chamber 12a and the second chamber 12b is indicated also as rod chamber 12b.

The operation of the first and second hydraulic cylinders 10 and 12 is precisely controlled and timed by a hydraulic sequencing circuit of the valve structure 1, said hydraulic sequencing circuit being configured to precisely control the flow path and pressure of the work-fluid.

In particular, the hydraulic sequencing circuit comprises a relief valve 11 adapted to be in fluid communication with the first cylinder 10 and with the second cylinder 12.

As shown in the figures, the valve structure 1 comprises a first duct 7' adapted to connect the first interconnection port 7a with the first seat 5 (in particular the intermediate chamber 5f thereof), a second duct 7" adapted to connect the second interconnection port 7b with the outlet 110 of the relief valve 11, a third duct 8' adapted to connect the third interconnection port 8a with the inlet 11i of said relief valve 11, and a forth duct 8" adapted to connect the fourth interconnection port 8b and the second seat 6 (in particular the intermediate chamber 6f thereof). A further duct 7''' is configured to connect the first interconnection port 7a and the return port 4, and a further duct 8''' is configured to connect the fourth interconnection port 8b and the return port 4.

Suitably, the valve structure 1 comprises a first connection duct 20 and a second connection duct 21 configured to connect portions of the first seat 5 and the second seat 6 to each other (in any case, another connection configuration may be adopted according to specific needs).

According to an embodiment of the present disclosure, the first connection duct 20 is arranged between the first end containment chamber 5a of the first seat 5 and the corresponding first end containment chamber 6a of the second seat 6 (i.e. the chambers on the left according to the reference system of the figures). Therefore, the portions of the first seat 5 and of the second seat 6 that are connected by the first connection duct 20 are the first end containment chambers 5a and 6a.

Moreover, the second connection duct 21 is arranged between one of the intermediate containment chambers of the first seat 5 (chamber 5e in the example of the figures) and the central containment chamber 6c of the second seat 6.

As mentioned before, a first spool (or selector) 13 and a second spool (or selector) 14 are slidably housed inside the first seat 5 and the second seat 6, respectively. The first spool 13 and second spool 14 are configured to control the work-fluid passage between the pump P, the first seat 5, the second seat 6, the first hydraulic cylinder 10, the second hydraulic cylinder 12 and the tank T, in order to control the actuation of said first hydraulic cylinder 10 and said second hydraulic cylinder 12 according to a precise work sequence for aligning and turning the plough. In other words, the sequencing circuit of the valve structure 1 is configured to control the movement of the spools 13 and 14 in order to define the flow path and fluid pressure suitable for executing the corresponding steps of the plough work sequence. The operational interconnection between the first seat 5 and the second seat 6 (and the other components of the valve structure 1) is thus controlled by the first spool 13 and the second spool 14, in particular by controlling the relative displacement thereof.

In an embodiment, also the spools 13 and 14 comprise adjacent chambers (e.g. five chambers), each moving chamber determining a specific path of the work-fluid.

According to an embodiment of the present disclosure, the first spool 13 comprises two housing seats 18a and 18b at the opposite end thereof (e.g. opposed with respect to the longitudinal axis H-H), and the second spool 14 comprises two corresponding housing seats 19a and 19b at the opposite end thereof, said housing seats 18a-18b being shaped to house elastic members 22a-22b (such as springs) for controlling the movement of said first spool 13 and said housing seats 19a-19b being shaped to house elastic members 23a-23b (such as springs) for controlling the movement of said second spool 14. In an embodiment, the housing seats 18 and 19 are in the form of an open recess in the spools 13 and 14 to house the elastic members 22a-22b and 23a-23b.

In other words, the valve structure 1 comprises elastic members 22a-22b and 23a-23b, usually comprising springs, acting between the body 2, and more particular the closure members 15, and the respective spool 13 and 14, and are configured to move said spools 13 and 14.

In an embodiment, the housing seats 18a-18b and 19a-19b are formed at the end chambers of the spools 13 and 14.

According to an embodiment of the present disclosure, the housing seats 18a and 18b of the first spool 13 are configured to receive the work-fluid from the end containment chambers 5a and 5b of the first seat 5, respectively, and the seats 19a and 19b of the second spool 14 are configured to receive the work-fluid from the end containment chambers 6a and 6b of the second seat 6, respectively. In other words, the housing seats 18a-18b and 19a-19b (which can be called also spring chambers) are in fluid communication with the respective end containment chambers of the first seat 5 and of the second seat 6, so that the work-fluid can be introduced in said housing seats 18a-18b and 19a-19b in order to cause a compression of the elastic members 22a-22b and 23a-23b when needed for moving the spools 13 and 14.

It is observed that the above-disclosed architecture is a non-limiting example and other configurations are possible: for example, the housing seats may not be present and the end containment chambers may act as spring chambers (i.e. the housing seats may be coincident with the end containment chambers), as well as other suitable configurations may be adopted.

The valve structure 1 of the present disclosure further comprises a relief valve 24 arranged in a first return path (i.e. the duct 7''') of the work-fluid between the first chamber 10a of the first hydraulic cylinder 10 and the second port 4, which, in the first configuration of the plough, is connected to the tank T.

Moreover, the valve structure 1 of the present disclosure comprises another relief valve, herein indicated with the reference 27, arranged in a second return path (i.e. the duct 8''') of the work-fluid between the second chamber 12b of the second hydraulic cylinder 12 and the second port 4.

It is observed that the ducts 7''' and 8''' may also be seen as different portions of a same return path of the valve structure 1.

The operation of the valve structure 1 according to the disclosure is as follows.

When the operator does not interact with the tractor commands (e.g. with the distributor D of FIG. 1) of the valve structure 1, the first spool 13 and the second spool 14 are at an initial neutral position (also called initial operating position) due to the action of the elastic members 22a-22b and 23a-23b (which maintain the spools 13 and 14 substantially in a central position in the respective seats 5 and 6). This neutral position of the spools 13 and 14 maintains the first hydraulic cylinder 10 retracted and the second hydraulic cylinder 12 extended, which, as seen before, corresponds to the working configuration of the plough.

The hydraulic sequencing circuit of the valve structure 1 is suitably configured such that, when the operation of the machine is started and a first configuration is selected by the operator by acting on the tractor commands (i.e. the pump P is connected to the first port 3 by the distributor D), the working sequence leading to the rotation and alignment of the plough is activated.

Figure 2B:
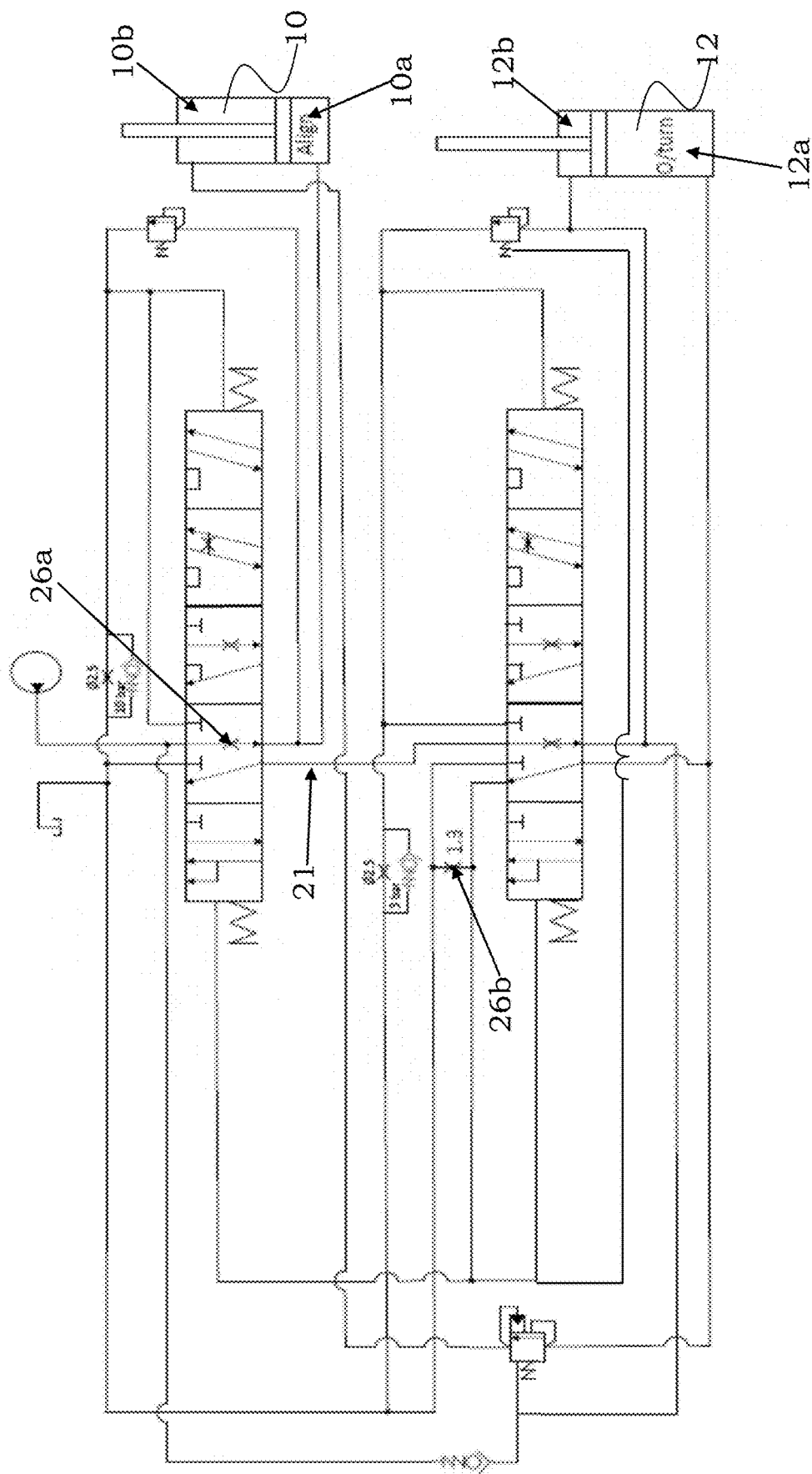
FIG. 2B shows the related detailed hydraulic circuit.

In this first configuration (i.e. when the pump P is connected to the first port 3), in a first step of the working sequence as shown in FIGS. 2A and 2B, the work-fluid is supplied to the first port 3 from the pump P; in other words, the work-fluid is pumped into the first seat 5 via the first port 3. The initial neutral position of the spools 13 and 14 is such that the work-fluid flows to the first chamber 10a of the alignment cylinder 10 through the first spool 13 and the first interconnection port 7a in order to extend said first hydraulic cylinder 10.

Suitably, a first restrictor 26a is formed at the first spool 13, said first restrictor 26a being arranged and configured so that, when the first spool 13 and the second spool 14 are at the initial neutral position, the work-fluid from the pump P passes through said first restrictor 26a before entering the first chamber 10a of the first hydraulic cylinder 10, thus avoiding hydraulic shocks. In other words, the pump P is connected the head side 10a of the alignment cylinder 10 through the restrictor 26a on the first spool 13.

As depicted in FIG. 2A, the first restrictor 26a is made in the second chamber of the first spool 13 when counting from the left-end-side thereof.

More in particular, the first restrictor 26a is such that the work-fluid entering in the central containment chamber 5c of the first seat 5 can ooze toward the adjacent intermediate containment chamber 5f (which is connected to the first chamber 10a of the first hydraulic cylinder 10 via the first duct 7'), avoiding hydraulic shocks and sending a small amount of fluid in the first chamber 10a of the first hydraulic cylinder 10. In other words, when the spool 13 is at the initial neutral position at the beginning of the working cycle, the fluid is forced to flow into the first chamber 10a of the first hydraulic cylinder via the first restrictor 26a, suitably avoiding hydraulic shock and preventing the relief valve 24 from opening.

The fluid which is discharged from the second chamber 10b of the first hydraulic cylinder 10, whose rod is now extending, flows through the second interconnection port 7b, the relief valve 11, the second spool 14, the first connection duct 20, and then it is discharged into the tank T via the second port 4.

More in particular, the rod chamber 10b of the alignment cylinder 10 is connected to the outlet 11o of the relief valve 11, which has a large secondary area and a separate spring chamber. In this way, the secondary area of the relief valve 11 is configured in such a way that the work-fluid which is discharged from the rod chamber 10b of the alignment cylinder 10 passes through the second interconnection port 7b and then from the outlet 11o to the inlet 11i of said relief valve 11 before entering into the second spool 14.

According to an embodiment of the present disclosure, the valve structure 1 comprises a second restrictor 26b arranged in the return path of the fluid discharged from the rod chamber 10b of the alignment cylinder 10 and leaving the second spool 14. In particular, the second restrictor 26b is arranged in parallel to the first connection duct 20 and configured to cause a pressure drop of the work-fluid passing therethrough and to cause a corresponding pressure increase in the portions of the first seat 5 and of the second seat 6 in fluid connection with said first connection duct 20. In other words, the work-fluid from the relief valve 11 passes through the second spool 14 and then through the second restrictor 26b, which is in fluid connection with the first end containment chamber 5a of the first seat 5 and with the first end containment chamber 6a of the second seat 6, and therefore in fluid connection with the respective housing seats 18a and 19a housing the spring members 22a and 23a. In this way, the pressure drop across this second restrictor 26b causes the pressure in spring chambers to increase, leading to a displacement of the first spool 13 and of the second spool 14.

In this way, the pressure exerted by the return flow that is flowing towards the second port 4 is such that the first spool 13 and the second spool 14 are moved from their neutral position by the work-fluid supplied in the spring chambers (e.g. they are moved to the right according to the reference system of the figures). This new relative position of the first spool 13 and the second spool 14 enables the work-fluid from the pump P to be supplied toward the first chamber 10a of the first hydraulic cylinder 10 through the first spool 13 without passing through the first restrictor 26a.

Figure 3A:
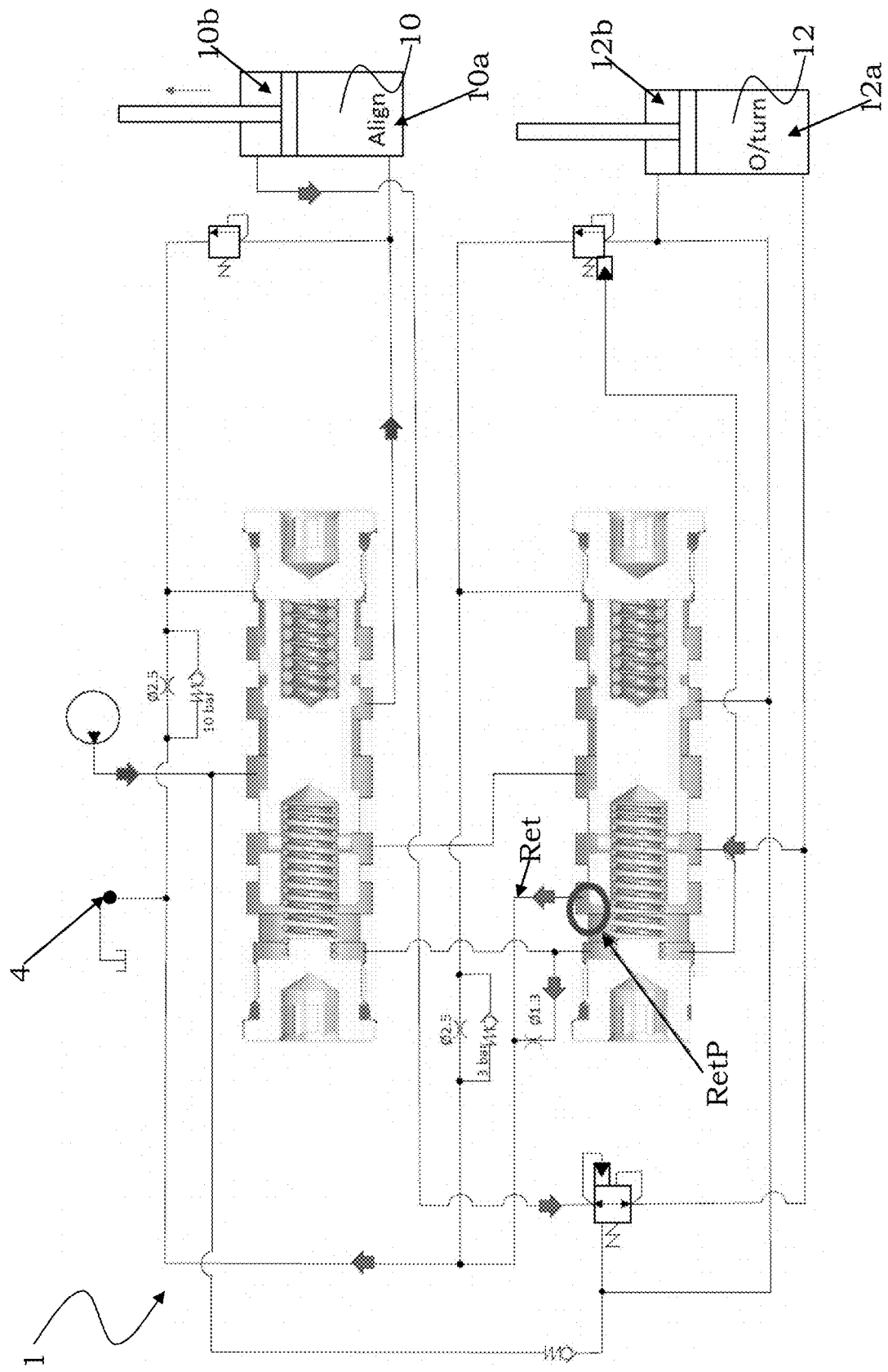
FIG. 3A shows a sectional view of the valve structure of the present disclosure and the main connections thereof according to a second step of the plough operation.
Figure 3B:
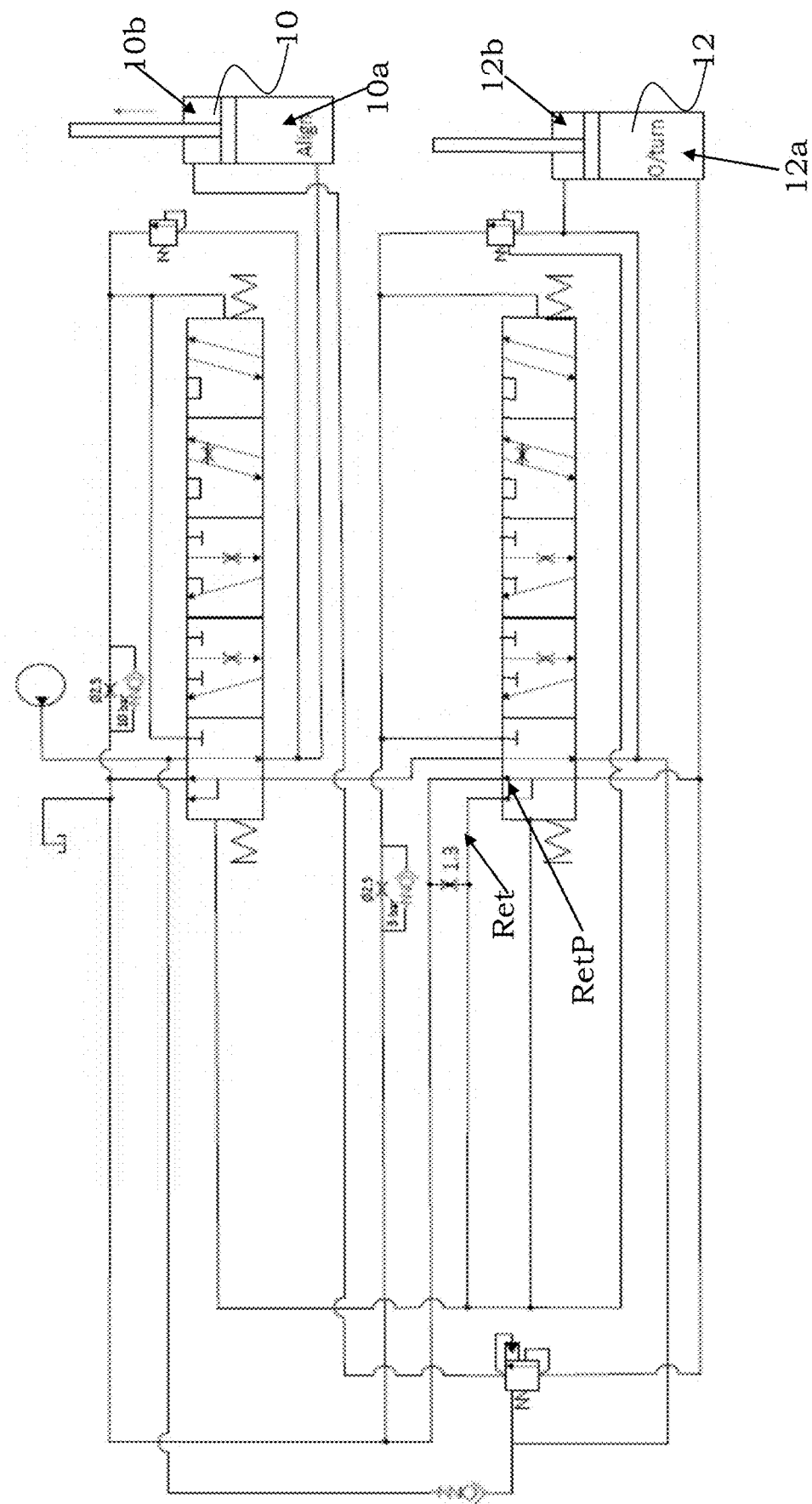
FIG. 3B shows the related detailed hydraulic circuit.

More in particular, as shown in FIGS. 3A and 3B, the displacement of the first spool 13 thus removes the first restrictor 26a from the flow path; even more particularly, as shown in FIG. 3B, the work-fluid passes through the left-end chamber of the first spool 13.

Moreover, the position of the second spool 14 is such that the return flow no longer has to pass only through the second restrictor 26b and can now pass also through the return duct Ret, which directly connects the intermediate containment chamber 6d of the second seat 6 and the return port 4 (the return duct Ret is then connected with the other return ducts 7''' and 8''', which in this step are not used due to the presence of the relief valves 24 and 27, which are still closed). As seen before, the return ducts 7''', 8''' and Ret may be seen as portions of a same return duct of the valve structure 1.

As shown in FIG. 3B, this position of the second spool 14 is such to open the passage RetP on said second spool 14 (which was closed in the initial neutral position of the second spool 14), allowing the work-fluid to flow from the second spool 14 into the return duct Ret towards the tank T. This configuration achieves a force balance to maintain the second spool 14 in this position.

The alignment cylinder 10 now moves at full speed. The second hydraulic cylinder 12 does not move because the position of the first spool 13 does not allow the work-fluid to pass through the second connection duct 21, and therefore the work-fluid does not enter into the second seat 6 and the second spool 14, and thus does not enter into the second hydraulic cylinder 12.

Figure 4A:
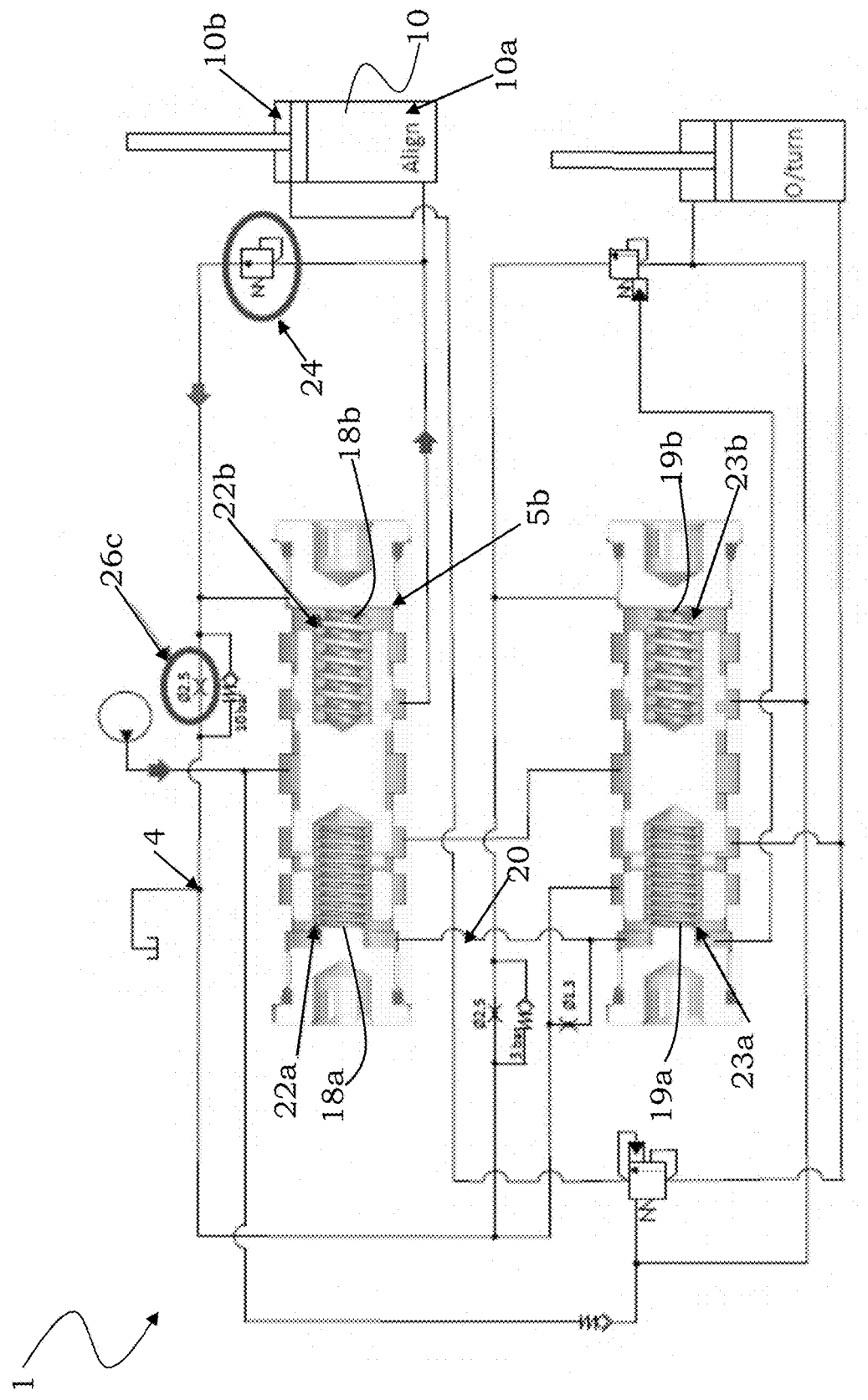
FIG. 4A shows a sectional view of the valve structure of the present disclosure and the main connections thereof according to a third step of the plough operation.
Figure 4B:
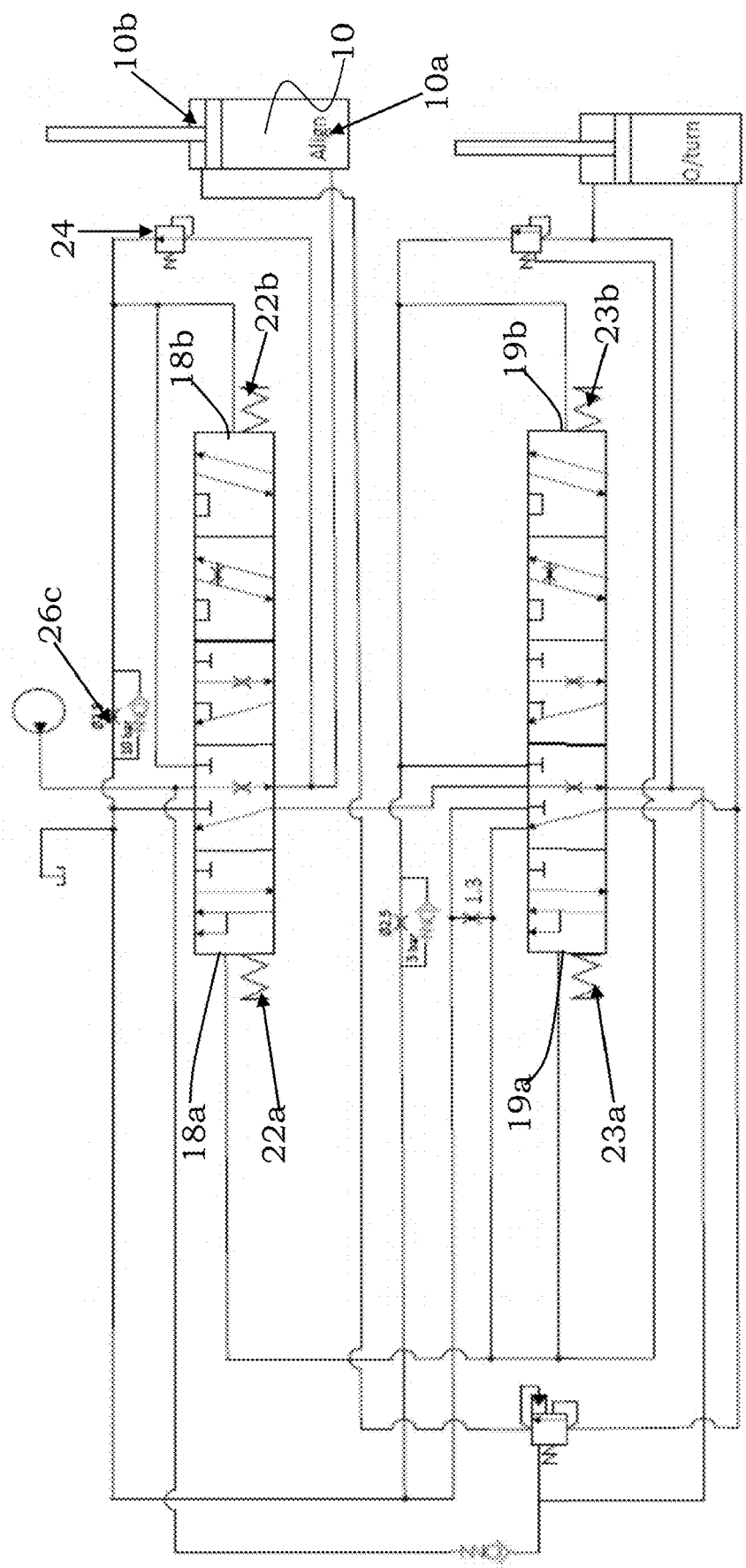
FIG. 4B shows the related detailed hydraulic circuit.

The alignment cylinder 10 then reaches the end of stroke, as shown in FIGS. 4A and 4B. As there is no return flow from the rod chamber 10b of said alignment cylinder 10, no pressurized fluid flows in the first connection duct 20 and the pressure at the corresponding ends of the first spool 13 and second spool 14 (i.e. in the housing seats 18a and 19a connected with the end containment chambers 5a and 6a) decreases so that both spools 13 and 14 move from the right to a central position, i.e. they moves towards the initial neutral position (as better shown in FIG. 4B), in which position the work-fluid cannot pass from the first seat 5 to the second seat 6 and is directed only into the first chamber 10a of the first hydraulic cylinder 10. The pressure in said first chamber 10a of said first hydraulic cylinder 10 increases and opens the relief valve 24, said relief valve 24 being thus configured such that, when the first hydraulic cylinder 10 reaches the end of the stroke and no fluid is discharged from the second chamber 10b thereof, it is in an open state.

According to an embodiment of the present disclosure, the valve structure 1 further comprises a third restrictor 26c which, in the first configuration, is arranged in the return path 7''' between the second port 4 and the relief valve 24 and is connected to the first seat 5 via a duct Du. This third restrictor 26c is configured to cause a pressure drop of the work-fluid passing therethrough and to cause a corresponding pressure increase in a portion of the first seat 5 in fluid connection with said third restrictor 26c. More in particular, the portion of the first seat 5 in fluid connection with said third restrictor 26c is the second end containment chamber 5b, the third restrictor 26c being configured in such a way that the pressure of the work-fluid in said second end containment chamber 5b is increased to cause a corresponding pressure increase in the housing seat 18b of the first spool 13 and thus to cause the movement of said first spool 13.

In other words, once the relief valve 24 is opened, the work-fluid passes through the third restrictor 26c, which increases the pressure at the second end containment chamber 5b of the first seat 5, shifting the first spool 13 to the left. In this case, the displacement of the first spool 13 caused by the presence of the third restrictor 26c is opposite with respect to the displacement caused by the second restrictor 26b.

This new displacement of the spool 13 enables the work-fluid to flow from the pump P, to the first spool 13, then to the second spool 14 (via the third chamber thereof when counting from the left-end side) and then to second chamber 12b of the second hydraulic cylinder 12, whose rod begins to be retracted.

In fact, once the first spool 13 is moved from its previous position, the passage Pass (highlighted in FIGS. 5A and 5B) on said first spool 13 is opened and the work-fluid can pass via said passage Pass and then to flow into the second spool 14. In an embodiment, the passage Pass is formed in the fourth chamber of the first spool 13 (counting from the left end side) and the work-fluid flows through the left end chamber of the second spool 14.

Figure 5A:
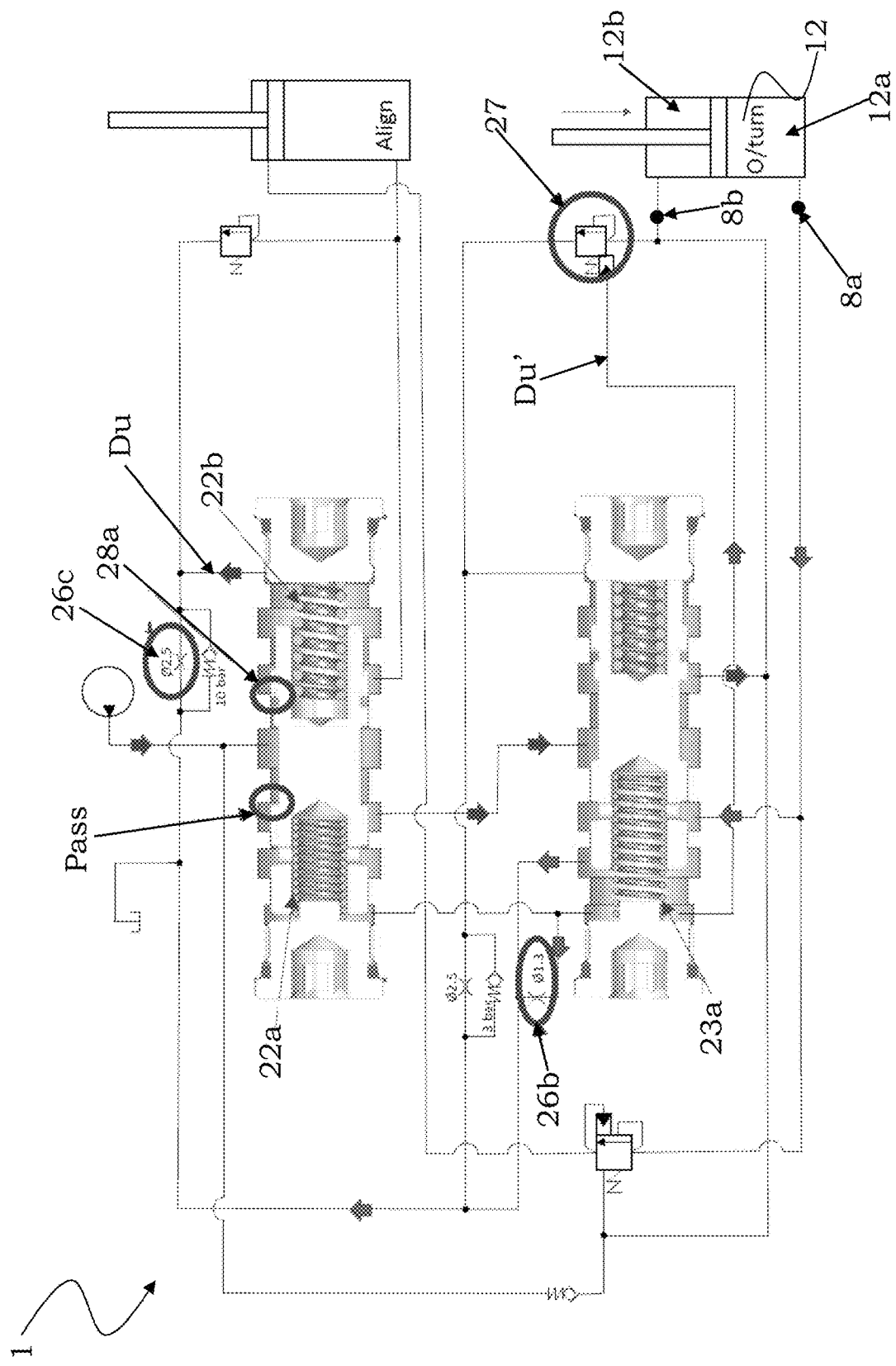
FIG. 5A shows a sectional view of the valve structure of the present disclosure and the main connections thereof according to a fourth step of the plough operation.
Figure 5B:
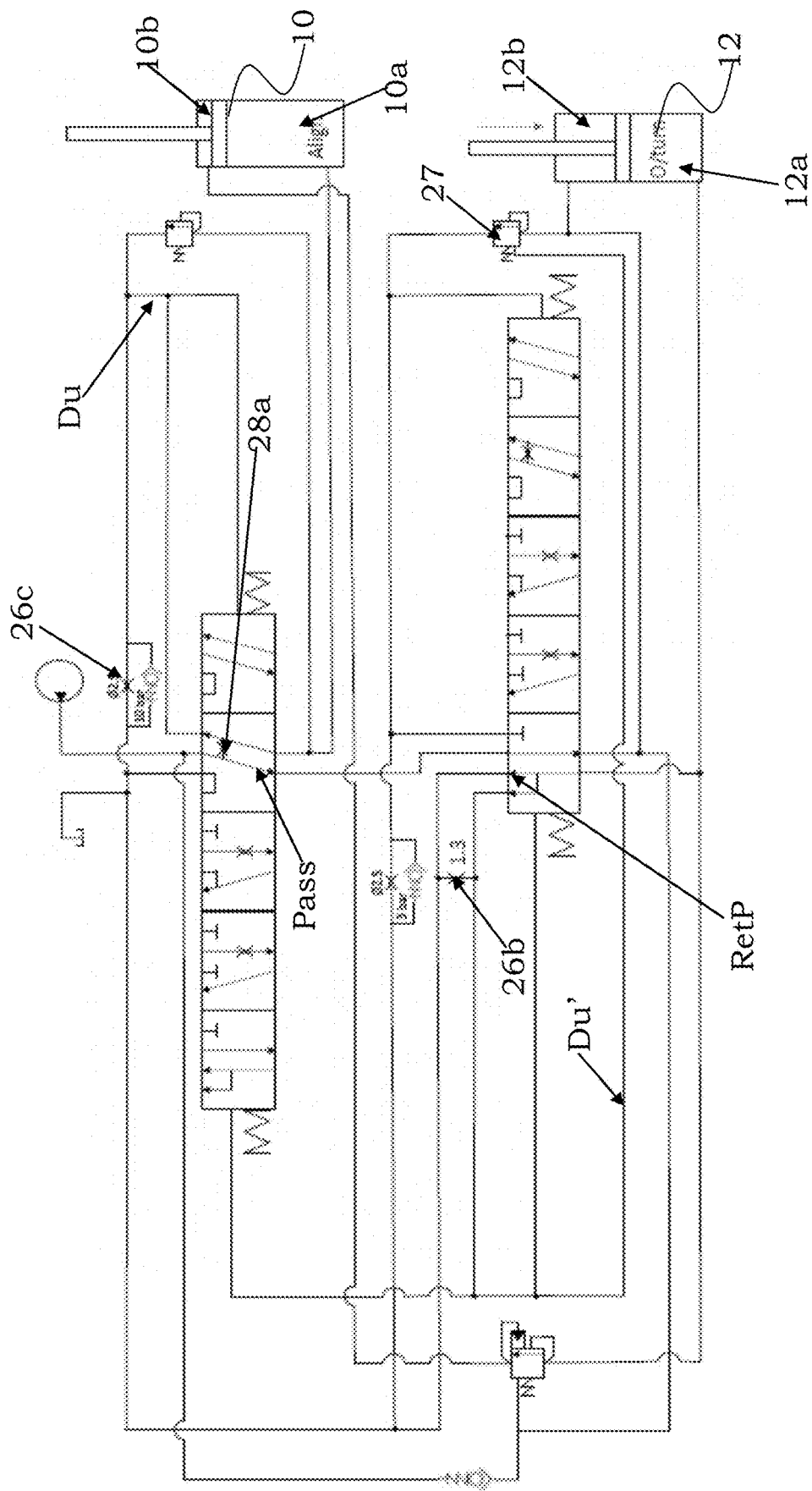
FIG. 5B shows the related detailed hydraulic circuit.

The return flow from the overturning cylinder 12 passes again through the second restrictor 26b (as already shown in connection with FIGS. 3A-3B), which causes the pressure where the elastic member 23a is to increase (i.e. in the housing seat 19a), in such a way that the second spool 14 is moved again to the right. FIGS. 5A-5B show this configuration, wherein the first spool 13 is shifted to the left due to pressure of the third restrictor 26c and the second spool 14 is shifted to the right due to the presence of the second restrictor 26b, with the opening of the passage RetP.

As seen before, due to presence of the first connection duct 20 connecting the end containment chambers 5a and 6a of the first seat 5 and of the second seat 6, this increased pressure due to the second restrictor 26b is also felt where the elastic member 22a is (i.e. in the housing seat 18a). In order to execute the proper working sequence, the first spool 13 should not move and should be maintained in its current position (i.e. shifted on the left according to the reference system of the figures, as shown in FIGS. 5A and 5B). In order to maintain the first spool 13 in this position, said first spool 13 comprises a restrictor 28a configured to provide the proper timing to allow this position to be maintained, so that the work-fluid can still flow from the pump P, then pass through the first spool 13, the second spool 14, and finally be supplied to the second chamber 12b of the second hydraulic cylinder 12.

More in particular, the notch 28a is in the form of a small restrictor formed in the chamber of the first spool 13 where the passage Pass is also present, so that a small amount of fluid can be delivered from said passage Pass to the duct Du which is in turn connected with the housing seat 18b of the elastic member 22b of said first spool 13, in order to exert a counterpressure. Advantageously, this notch 28a is dimensioned in such a way that it has the timing to allow the spool 14 to maintain the current position without causing an excessive pressure drop. Even more particularly, the notch 28a allows the work-fluid to flow across it, thus maintaining a flow through the third restrictor 26c so that the pressure in the housing seat 18b is equal to the pressure in the housing seat 18a plus the force of the elastic member 22a (e.g. less than 10 bar).

During this operation, the pressure in the housing seat 19a is as also taken to the back of the relief valve 27 via a further duct Du'. This keeps the relief valve 27 from opening. Summing up, when the first hydraulic cylinder 10 is fully extended and no work-fluid is discharged from the second chamber 10b thereof, the sequencing hydraulic causes the first spool 13 and the second spool 14 to be displaced relative to each other so that the work-fluid is allowed to pass via the second connection duct 21 from the first spool 13 to the second spool 14 and then to the second chamber 12b of the second hydraulic cylinder 12, whose rod is thus retracted.

Figure 6A:
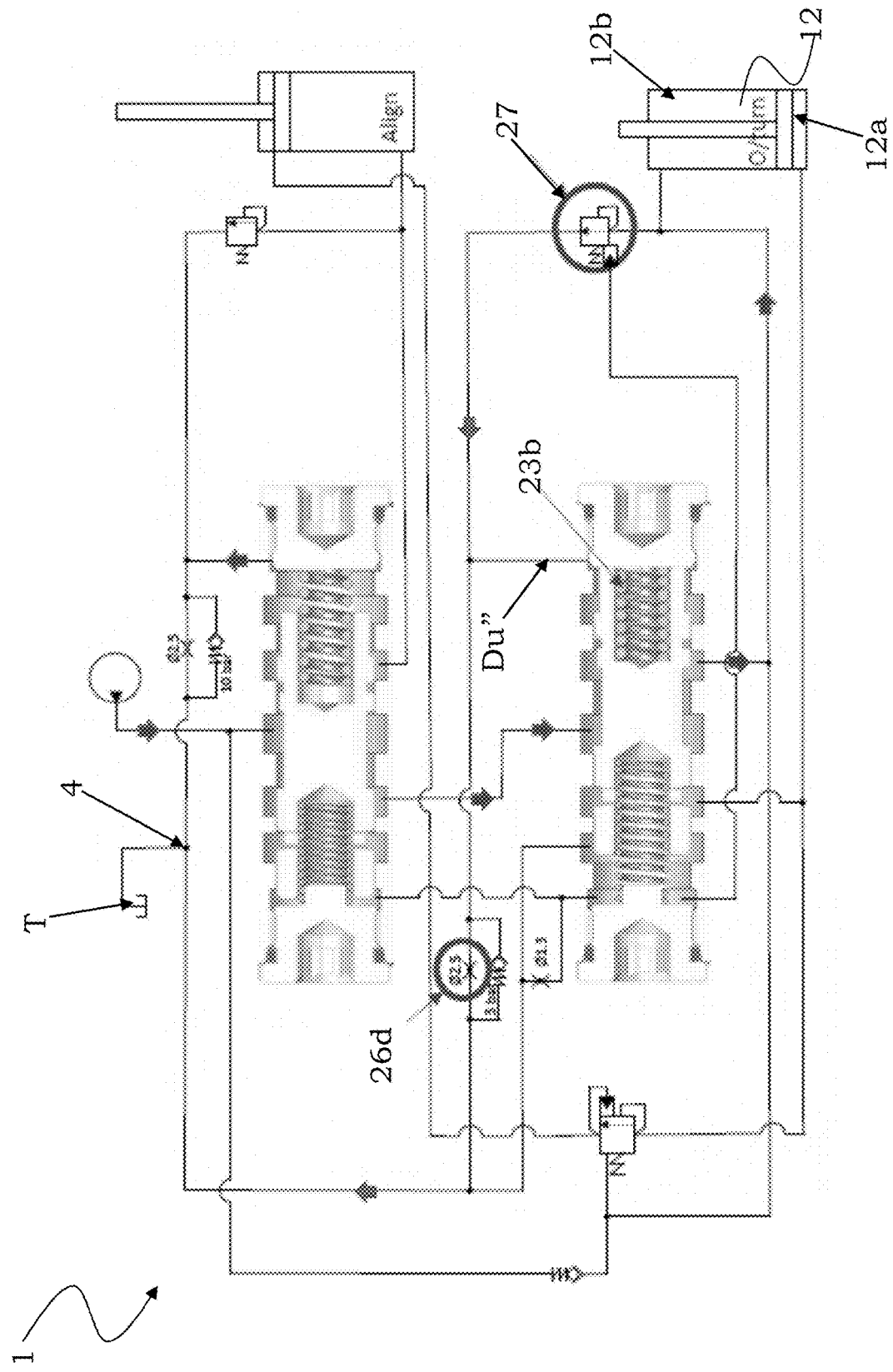
FIG. 6A shows a sectional view of the valve structure of the present disclosure and the main connections thereof according to a fifth step of the plough operation.
Figure 6B:
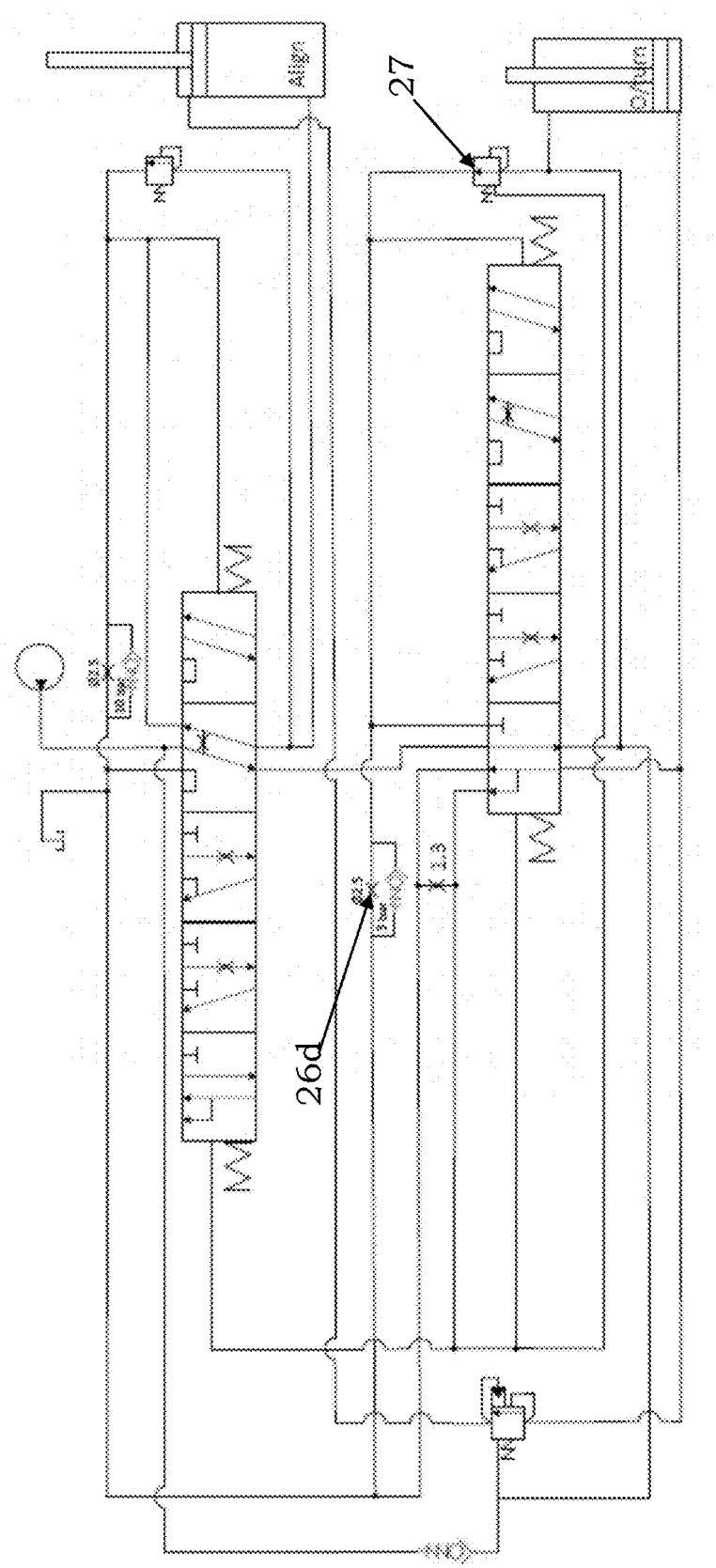
FIG. 6B shows the related detailed hydraulic circuit.

As shown in FIGS. 6A and 6B, with this configuration of the spools 13 and 14, the overturning cylinder 12 then reaches the end of stroke, corresponding to a 90° rotation of the plough. The pressure in the rod chamber 12b increases until it opens relief valve 27. The relief valve 27 is thus configured in such a way that, when the second hydraulic cylinder 12 reaches the end of the stroke and no fluid is displaced from the first chamber 10b thereof, it is in an open state.

According to an embodiment of the present disclosure, the valve structure 1 further comprises a fourth restrictor 26d which is arranged in the return path between the second port 4 and the relief valve 27 and is configured to cause a pressure drop of the work-fluid passing therethrough and to cause a pressure increase in a corresponding portion of the second seat 6 in fluid connection with said fourth restrictor 26d. More in particular, the portion of the second seat 6 receiving the pressurized fluid is the second end containment chamber 6b of said second seat 6 and the fourth restrictor 26d is configured in such a way that the pressure of the work-fluid in said second end containment chamber 6b is increased to cause the movement of the second spool 14. Even more particularly, the pressurized fluid is delivered to the end containment chamber of the second seat 6 by a further duct Du" connected to said end containment chamber.

Figure 7A:
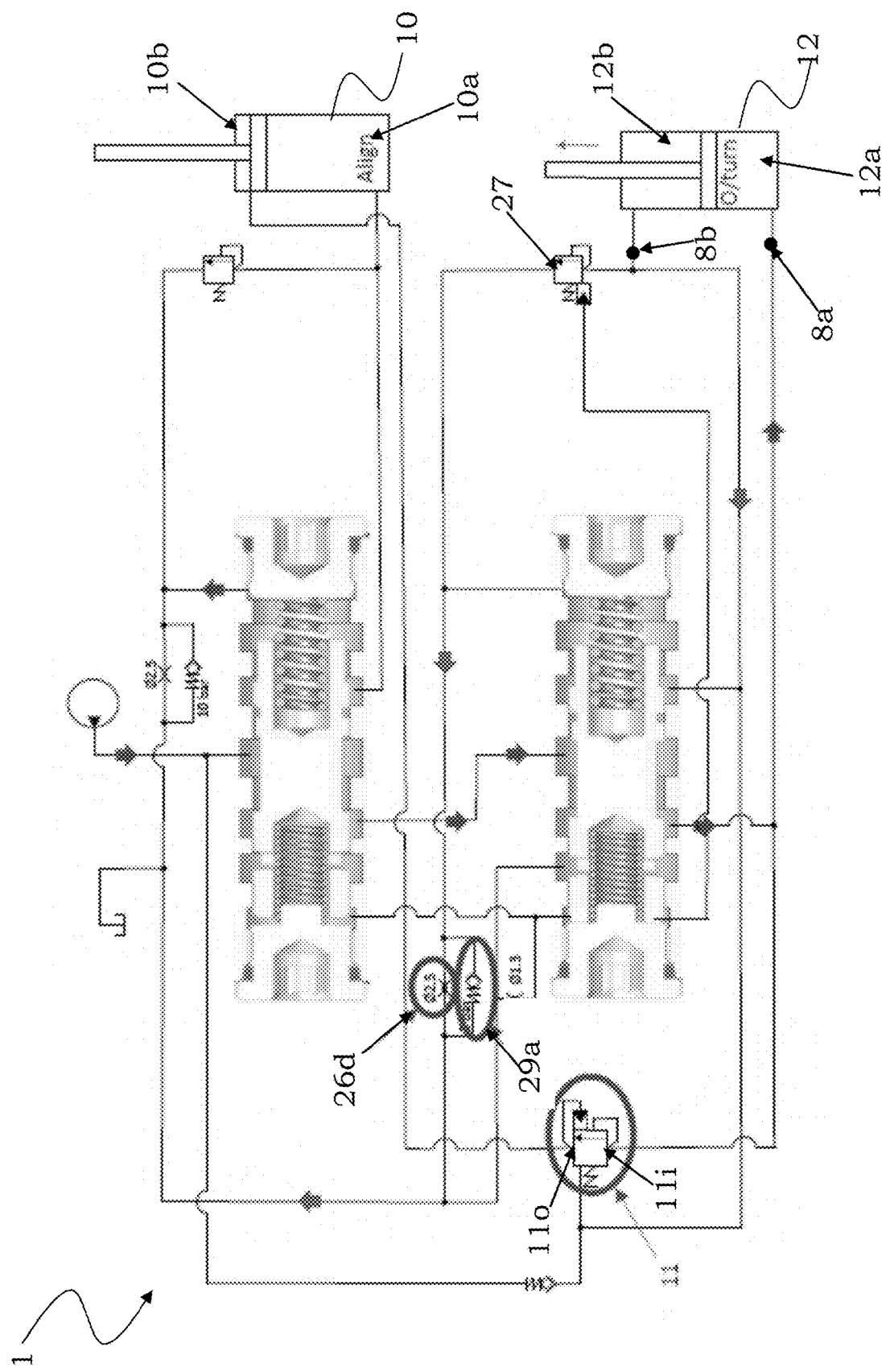
FIG. 7A shows a sectional view of the valve structure of the present disclosure and the main connections thereof according to a sixth step of the plough operation.
Figure 7B:
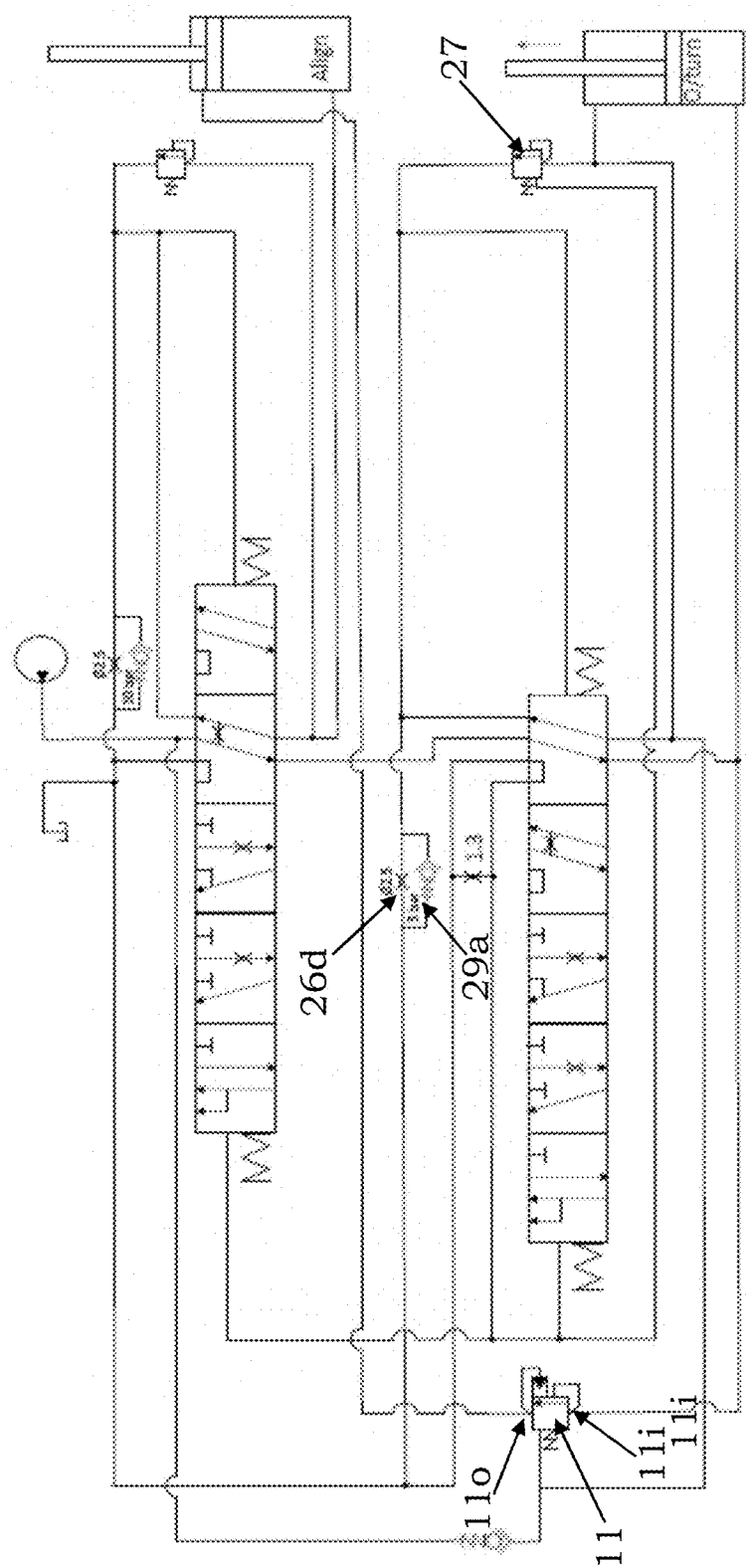
FIG. 7B shows the related detailed hydraulic circuit.

As shown in FIGS. 7A and 7B, the second spool 14 is thus configured to be moved by the work-fluid in the end containment chamber 6b in an opposite direction than the motion caused by the second restrictor 26b (i.e. it is shifted all to the left), allowing the work-fluid to flow from the pump P, through the first spool 13 (which remains in its previous position) to the first chamber 12a of the second hydraulic cylinder 12, which thus reverse its stroke, while the first hydraulic cylinder 10 does not move due to the presence of the relief valve 11.

In other words, when the second hydraulic cylinder 12 reaches the end of the stroke and no work-fluid is displaced from the first chamber 12a thereof, the relief valve 27 opens, therefore passing flow through the fourth restrictor 26d and increasing the pressure where the elastic member 23b is, so that the spool 14 shifts to the left. In this way, the first spool 13 and the second spool 14 are displaced relative to each other so that the work-fluid from the pump P is allowed to pass via the second connection duct 21 from the first spool 13 to the second spool 14 and then it is delivered into the first chamber 12a of the second hydraulic cylinder 12, whose rod is extending.

The pump flow is now directed to the head chamber 12a of the overturning cylinder 12. The return flow from that cylinder passes again through the fourth restrictor 26d.

According to an advantageous embodiment of the present disclosure, the valve structure 1 further comprises a check valve 29a arranged in parallel to the fourth restrictor 26d and configured to allow the passage of the return flow for pressure values ranging from 3 to 10 bar, preferably 4 bar. Therefore, return flow from the second hydraulic cylinder 12 directed to the second port 4 passes again through the fourth restrictor 26d and the check valve 29a, which has an opening pressure (due to its spring) sufficient to hold the second spool 14 in the left position.

Advantageously, the presence of the check valve 29a reduces excessive pressure drops due to the restrictor.

Moreover, the pressure generated on the rod chamber 12b of the overturning cylinder 12 is also felt in the spring chamber of relief valve 11 thanks to an auxiliary duct, holding this valve shut.

Figure 8A:
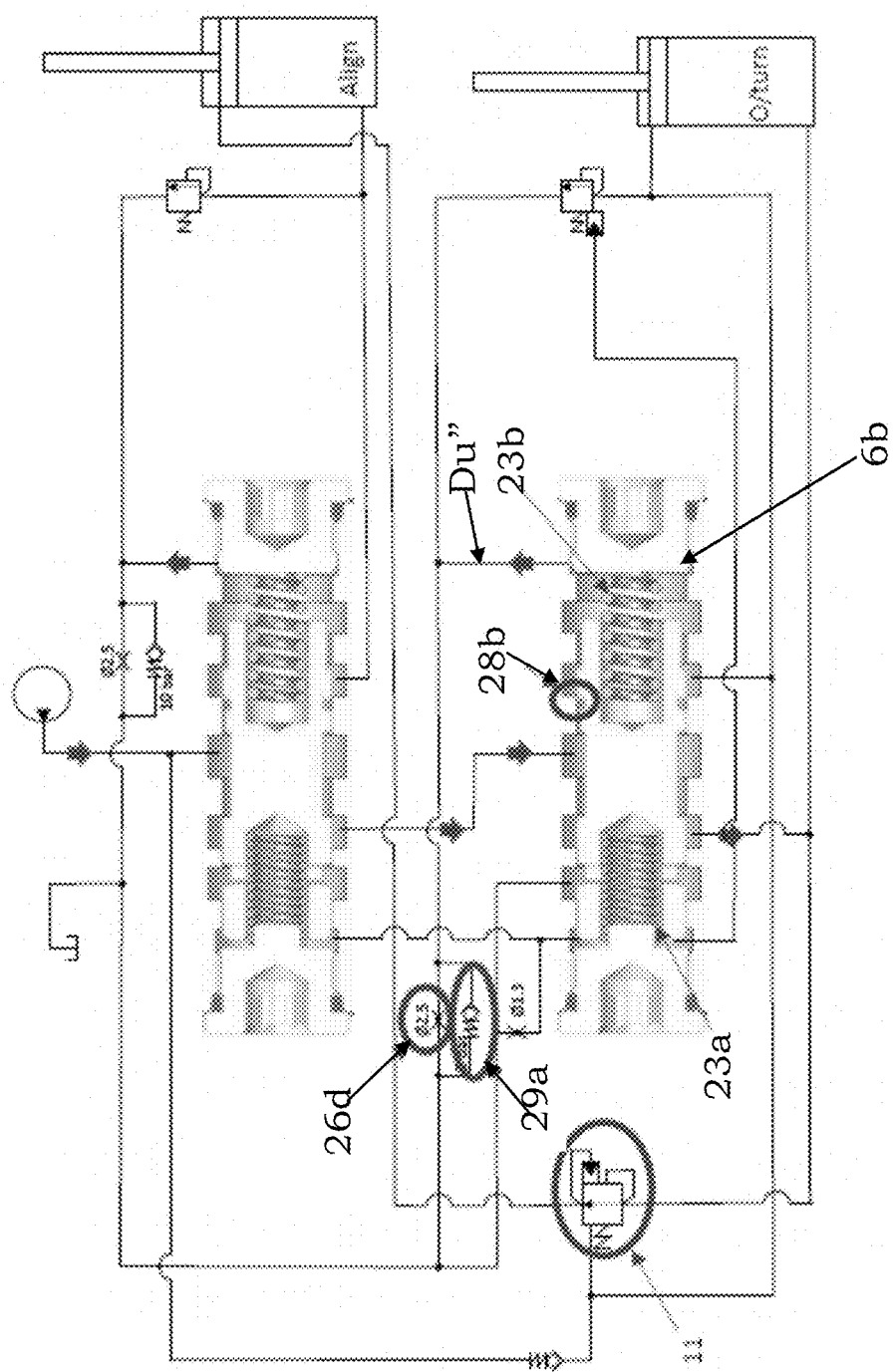
FIG. 8A shows a sectional view of the valve structure of the present disclosure and the main connections thereof according to a seventh step of the plough operation.
Figure 8B:
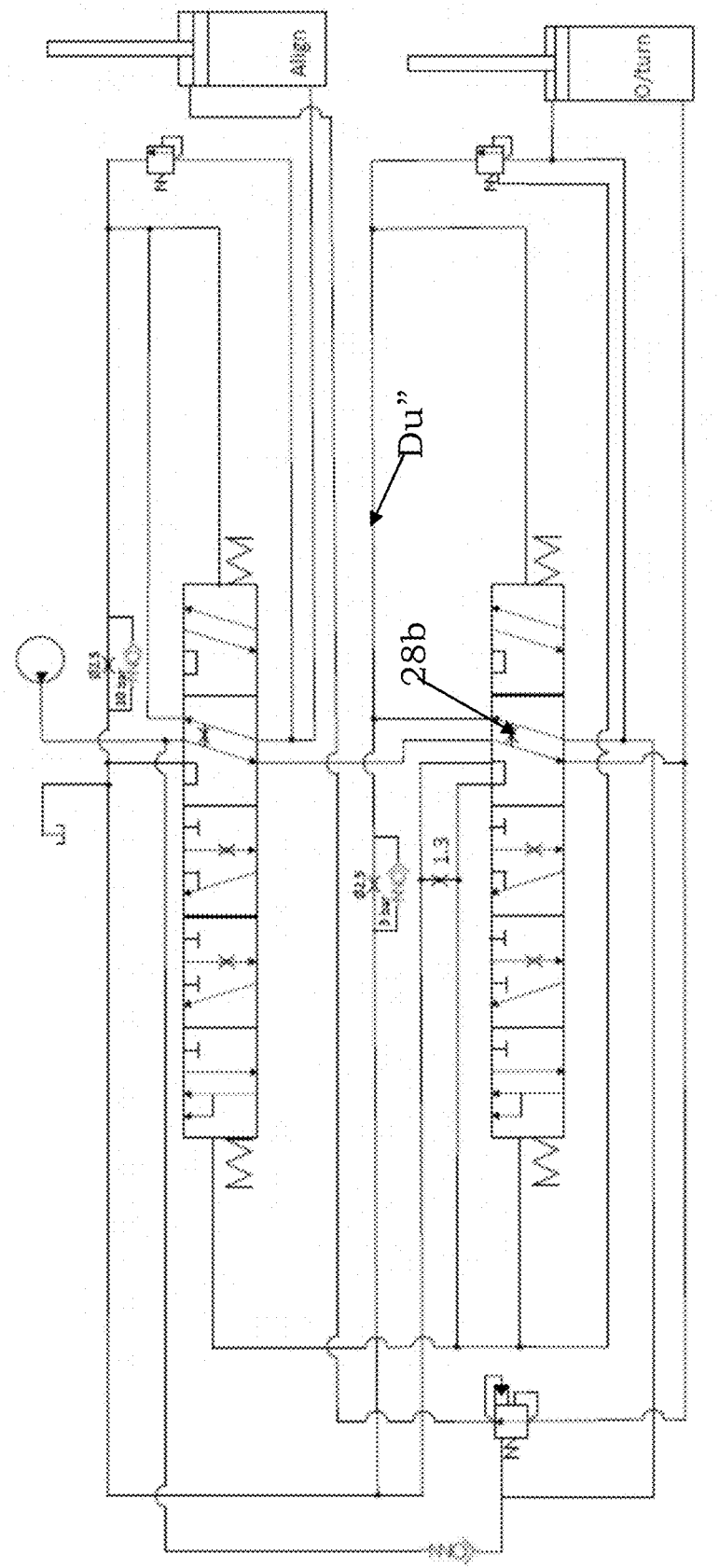
FIG. 8B shows the related detailed hydraulic circuit.

As shown in FIGS. 8A and 8B, the overturn cylinder 12 then reaches the end of stroke. The flow through the fourth restrictor 26d and check valve 29a decreases, leading to a pressure reduction at the second end containment chamber 6b of the second seat 6, i.e. where the elastic member 23b is. The second spool 14 then starts to move to the right (reaching an intermediate position), so that the work-fluid can flow from the pump P through the first spool 13, through the second spool 14, towards the first chamber 12a of the second hydraulic cylinder 12.

While the second spool 14 moves to the right, a notch 28b which is formed on said second spool 14 opens. More in particular, the notch 28b (which is formed for example in the fourth chamber of the second spool 14 when counting from the left-end side) enables a small amount of fluid to flow in the further duct Du" and then into the second end chamber 6a. This notch 28b is thus configured to provide the proper timing to allow said second spool 14 to maintain the above-mentioned intermediate position allowing the work-fluid to flow from the pump P through the first spool 13 and the second spool 14 towards the first chamber 12a of the second hydraulic cylinder 12.

In other words, when the second spool 14 moves, the notch 28b on the spool is opened maintaining a pressure where the elastic member 23b is and keeping the spool in said intermediary position (i.e. avoiding a complete displacement of the second spool 14 to the left).

Figure 9A:
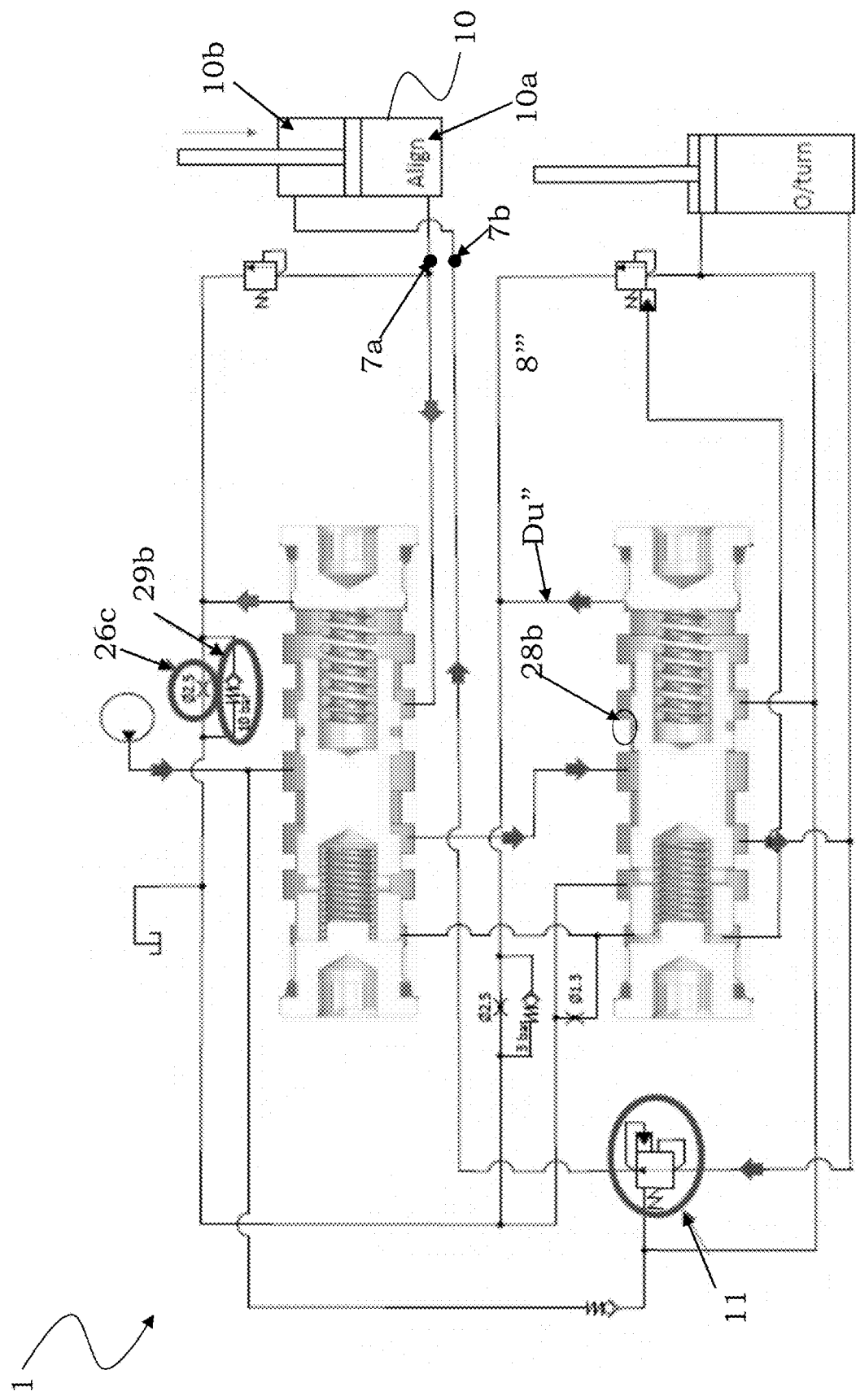
FIG. 9A shows a sectional view of the valve structure of the present disclosure and the main connections thereof according to an eight step of the plough operation.
Figure 9B:
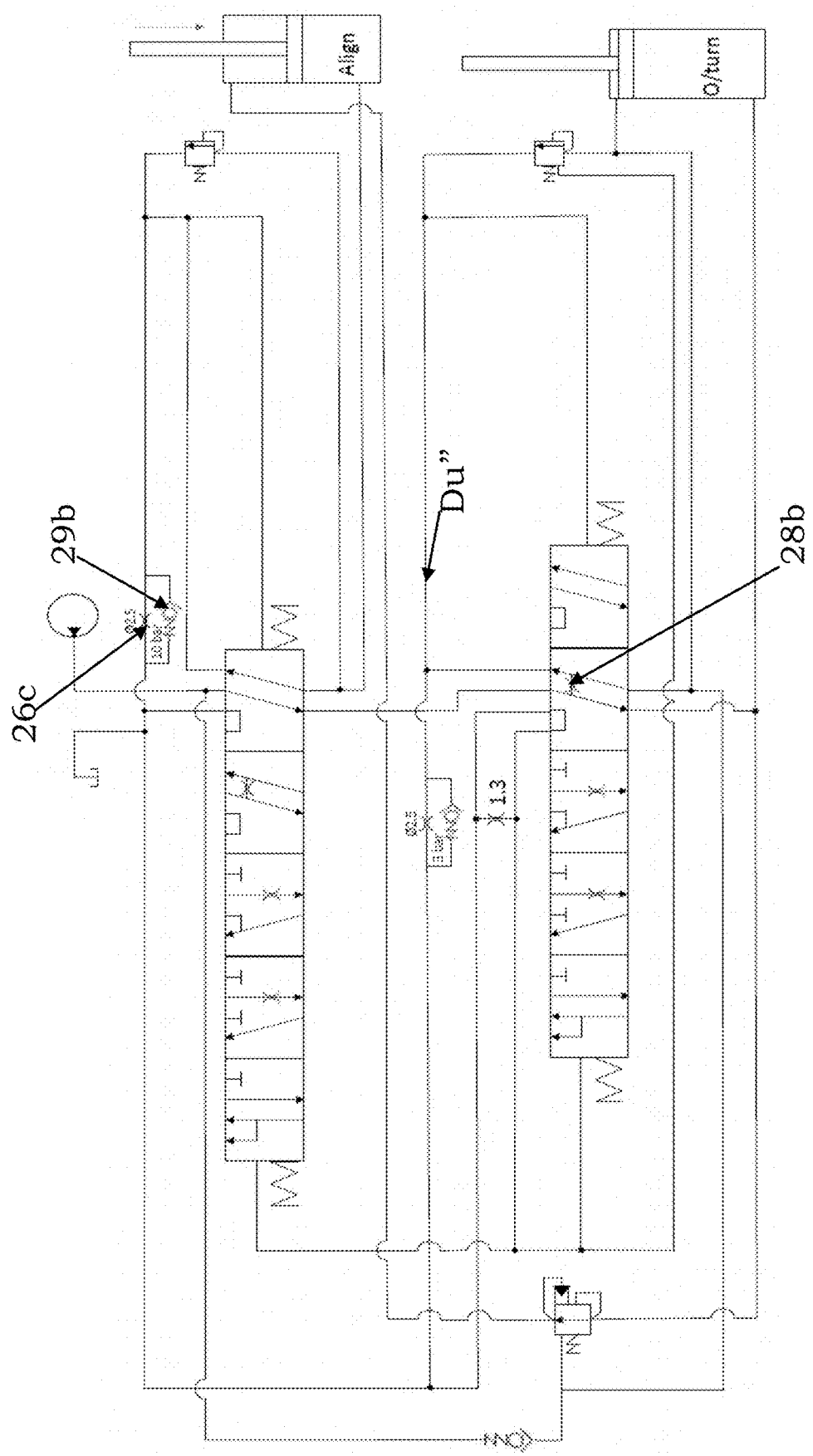
FIG. 9B shows the related detailed hydraulic circuit.

As better shown in FIGS. 9A and 9B, the pressure on the head chamber 12a of the overturning cylinder 12 then increases until it opens the relief valve 11. This allows the flow to reach the rod side 10b of the alignment cylinder 10 to complete the alignment of the plough.

Summing up, when the second hydraulic cylinder 12 reaches the end of the stroke and no work-fluid is displaced from the second chamber 12b thereof, the pressure of the work-fluid is such that the relief valve 11 is opened allowing fluid passage from the inlet 11i to the outlet 11o thereof, so that the work-fluid from the pump P is allowed to pass from the first spool 13 to the second spool 14 and then the first chamber 12a of the first hydraulic cylinder 10 via the relief valve 11 to complete the alignment of the plough. This is possible thanks to the presence of the notch 28b allowing a fluid to flow therethrough and to maintain the second spool 14 in this position.

According to an embodiment, the relief valve 11 has a calibration pressure comprises between 90 bar and 200 bar, preferably between 120 bar and 140 bar.

The rod side pressure of the alignment cylinder 10 holds the relief valve 11 open (due to its large secondary area). The pressurized work-fluid in thus introduced from the relief valve 11 into the second chamber 10b of the alignment cylinder, which retracts to align the plough and bring it in the working position. Therefore, the secondary area of the relief valve 11 is configured so that the pressure in the second chamber 10b of the first hydraulic cylinder 10 holds said relief valve 11 opened.

The return flow from the alignment cylinder passes again through the third restrictor 26c which, as seen before is arranged in the return path between the first spool 13 and the tank T.

Advantageously, the valve structure 1 further comprises a check valve 29b arranged in parallel to the third restrictor 26c and configured to allow the passage of the return flow for pressure values ranging from 2 to 10 bar, preferably 8 bar (i.e. the check valve 29b has an opening pressure of 10 bar due to its spring). In other words, the return flow from the alignment cylinder 10 passes through the third restrictor 26c until the pressure of 10 bar is reached, at which point check valve 29b opens.

As better shown in FIG. 9B, the first spool 13 is thus kept pushed all the way to the left (the notch 28a is not necessary anymore).

The alignment cylinder 10 can fully retract. At this point, the turning and the successive alignment of the plough is complete.

Clearly, some details of the above sequence (e.g. some specific component sequence) can be changed without departing from the spirit of the present disclosure, the figure being only non-limiting example of the present disclosure. Moreover, unless specified, the steps of the sequence may also be performed differently and/or may be changed or added to other steps.

Figure 10A:
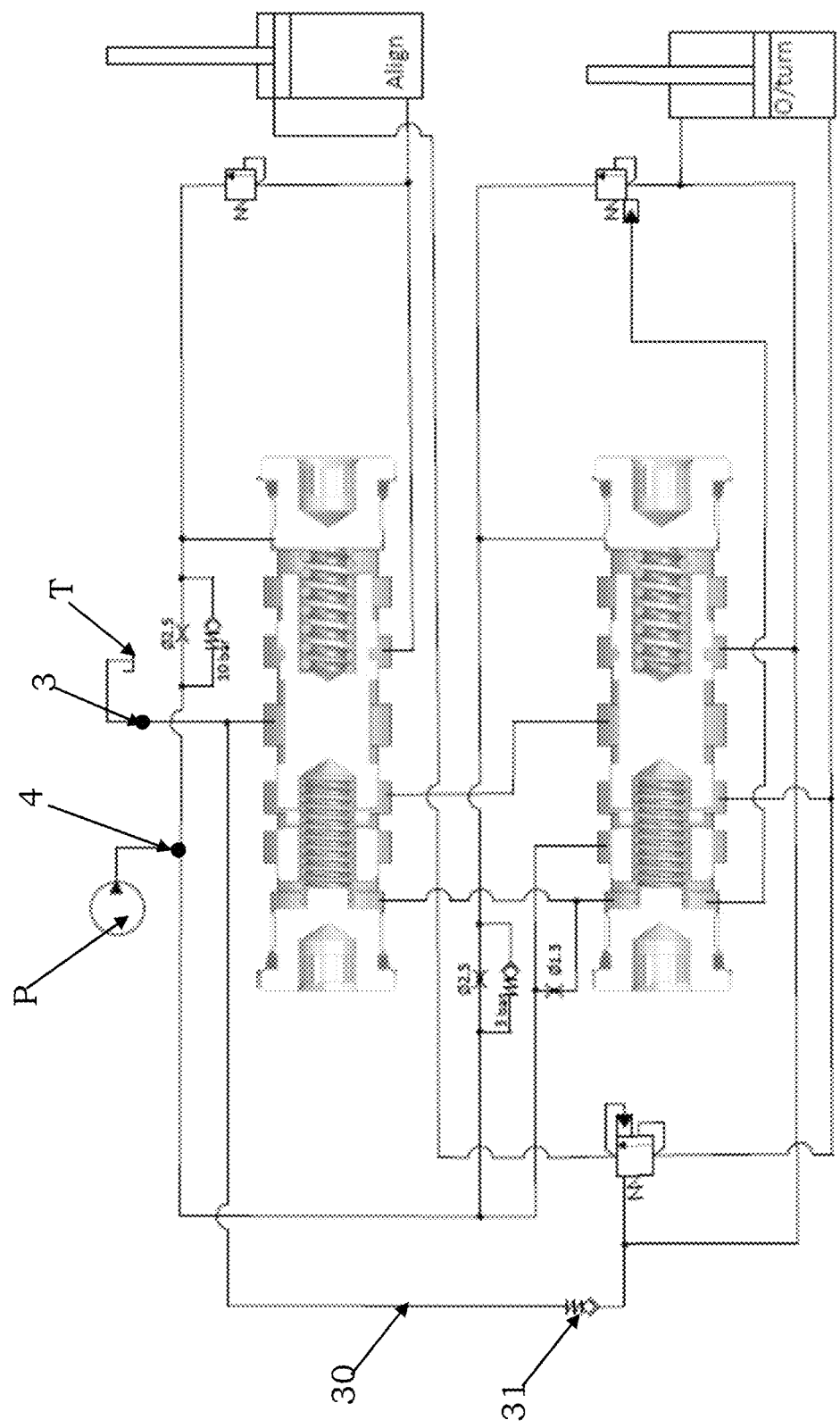
FIG. 10A shows a sectional view of the valve structure of the present disclosure and the main connections thereof during a reverse operation of plough.
Figure 10B:
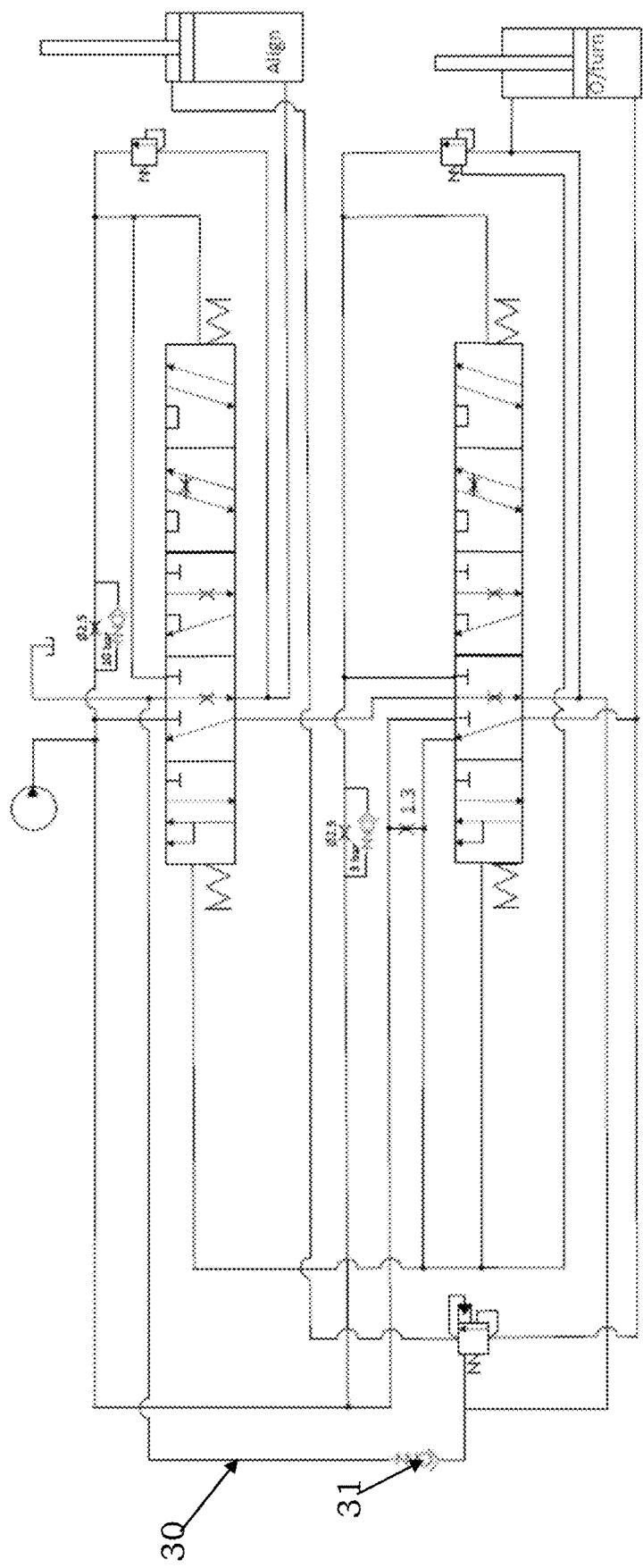
FIG. 10B shows the related detailed hydraulic circuit.

At times, during the operation of the plough, the operator will start the cycle but stops part of the way through. An example of when this occurs is during the plough setup, when the overturning mechanism has to be lifted from its mechanical stops to allow for these to be adjusted. In this case the operator has carried out the first alignment, and part of the overturning cycle, as shown in FIGS. 10A and 10B. In other words, for instance, when maintenance of the plough is needed, the working tools have to be raised, which is performed by operating the plough as disclosed previously in the normal operation; after maintenance, the plough has to be taken in the original position, i.e. by means of an inverse movement thereof.

In particular, the alignment cylinder 10 is fully extended and the overturning cylinder 12 is partially retracted. After the adjustment, the operator has to take the plough into its original position, and therefore he selects the spool control valve in the opposite direction (e.g., with reference to FIG. 1, he selects the distributor D in the crossed configuration, so that the inverse configuration is activated). The effect of this is that the pump and tank connection are swapped on the valve. In other words, the operator can act on the command and switch the pump P and the tank T in order to switch from the first configuration to the second reverse configuration.

More in particular, in this second reversed configuration, the first port 3 is connected with the tank T and the second port 4 is connected to the pump P.

At this end, the valve structure 1 comprises a third connection duct 30 adapted to connect the second hydraulic cylinder 12, in particular the second chamber 12b thereof, and the tank T in the second reversed configuration.

Advantageously according to the present disclosure, the valve structure 1 comprises a check valve 31 arranged in the third connection duct 30 and configured to allow the work-fluid to flow from second chamber 12b of the second hydraulic cylinder 12 to the tank T in the second reversed configuration of the plough and to block the work-fluid in the first configuration of the plough.

Suitably, the hydraulic sequencing circuit is configured such that, in this second reversed configuration, when the work-fluid is fed to the first port 3, it flows to the head chamber 12a of the second hydraulic cylinder 12 and then the work-fluid exiting from the rod chamber 12b passes through the third connection duct 30 (which is part of the return path in this second configuration) via the check valve 31 and then returns to the tank T. Clearly, the check valve 31 blocks the fluid in the first configuration, and enables the fluid passage only in the secondo reversed configuration, so that the addition of the third connection duct 30 does not affect the normal operation of the plough.

Figure 11A:
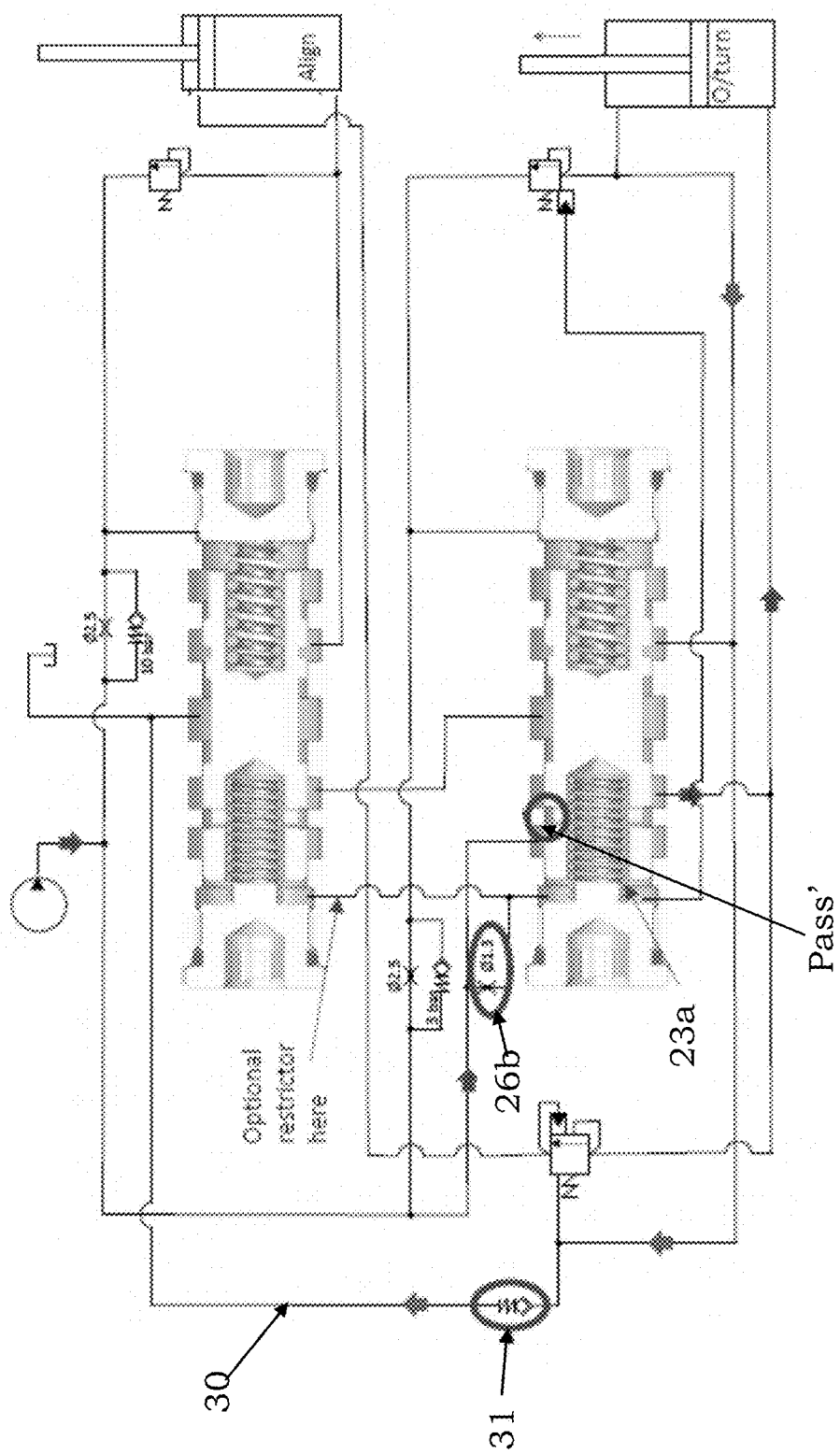
FIG. 11A shows a sectional view of the valve structure of the present disclosure and the main connections thereof during a step of the reverse operation of plough.
Figure 11B:
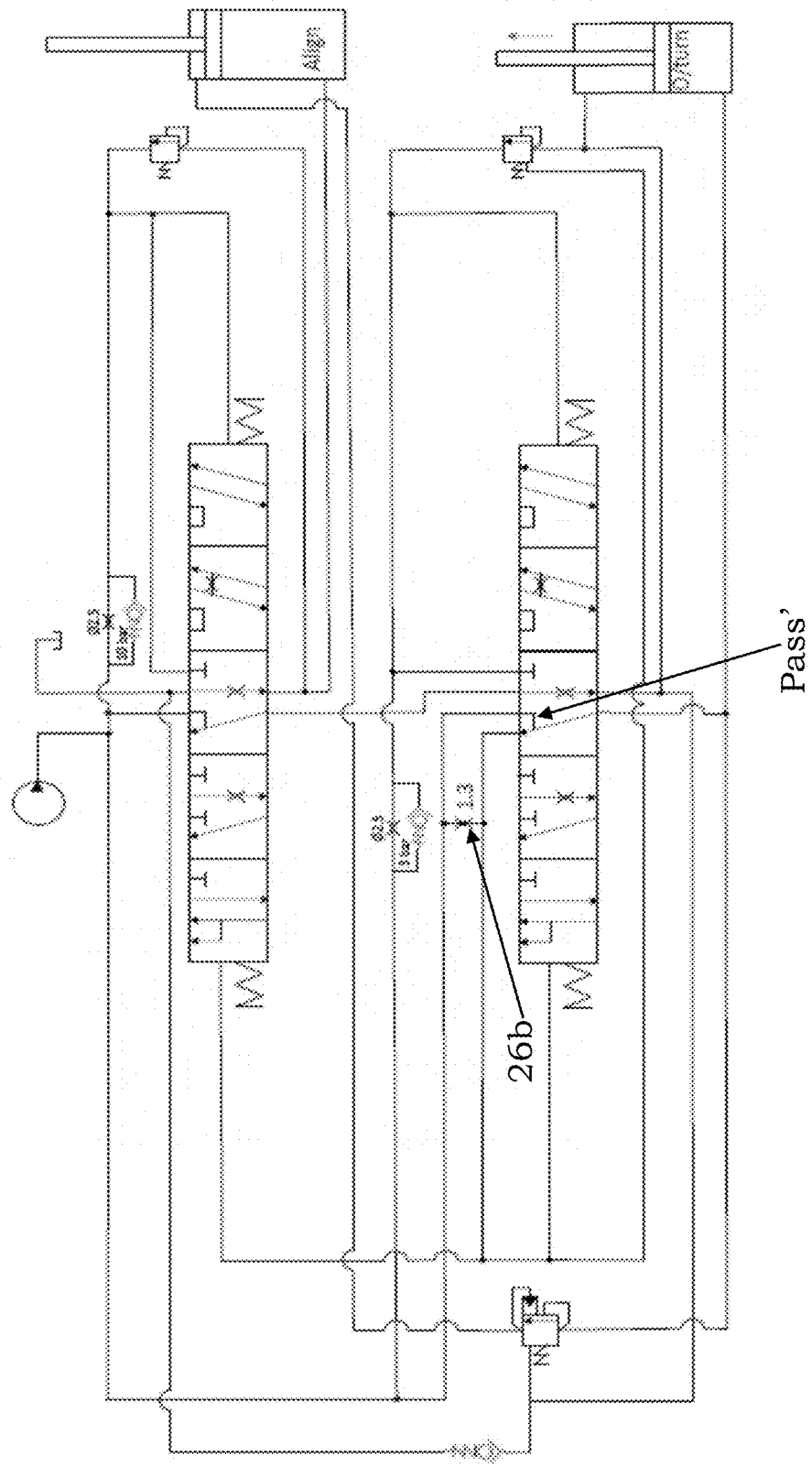
FIG. 11B shows the related detailed hydraulic circuit.

More in particular, with reference to FIGS. 11A and 11B, the work-fluid from the pump P passes through the second restrictor 26b. This reduces the pressure where the elastic member 23a is. The second spool 14 is thus slightly moved to the left until the passage Pass' on the second spool 14 opens. The second spool timing in passage Pass' is specifically selected to allow the reversing function to work.

The return flow from the rod chamber 12b of the overturning cylinder 12 is allowed to pass through the check valve 31 back to tank T. To avoid excessive flow passing through the first spool 13 to the rod chamber 12b of the overturning cylinder 12, and therefore being lost to tank T, an optional restrictor (not shown in the figures) can be added in the first interconnection duct 20.

In this step of the reversal operation, only the overturning cylinder 12 moves.

Figure 12A:
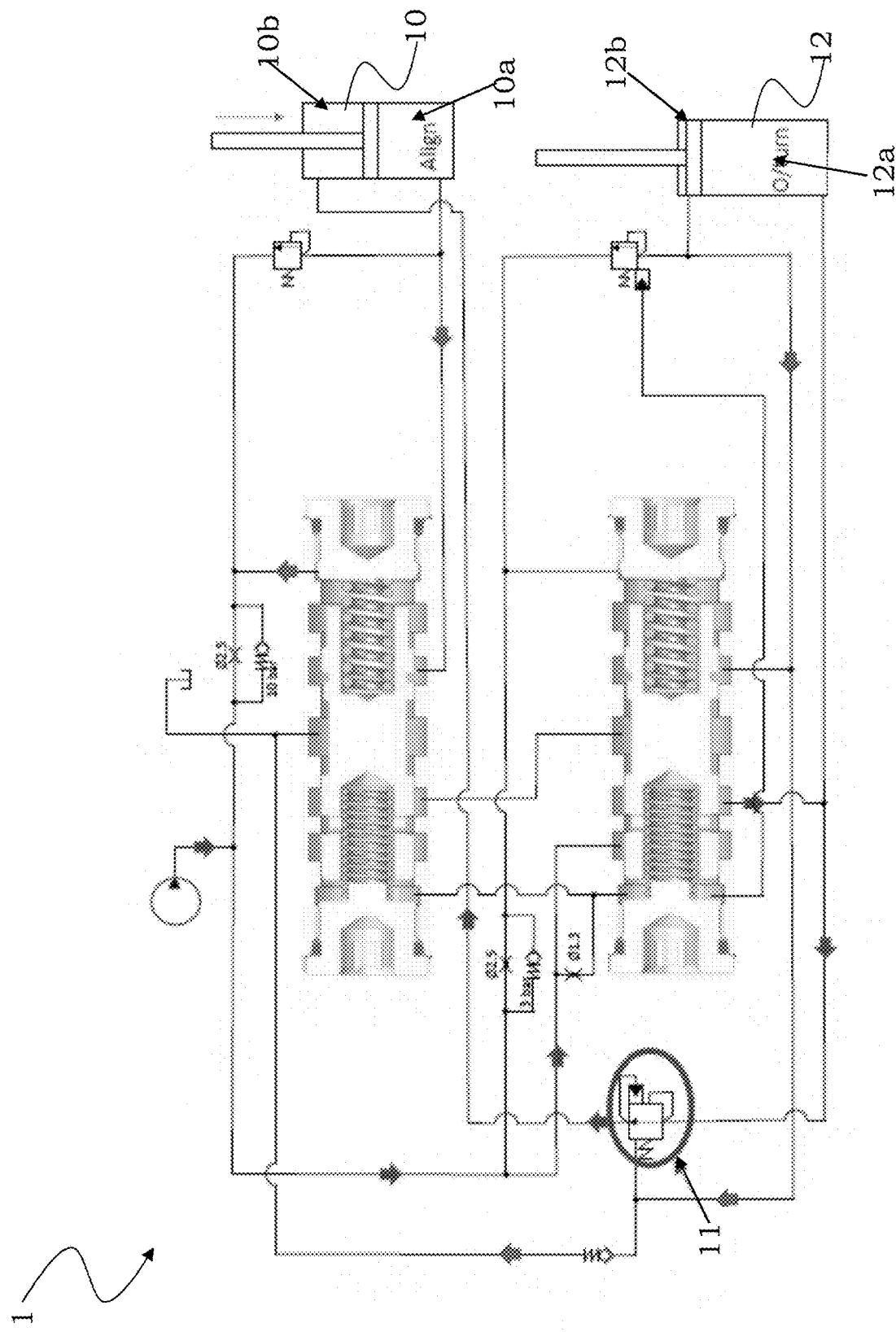
FIG. 12A shows a sectional view of the valve structure of the present disclosure and the main connections thereof during a further step of the reverse operation of plough.
Figure 12B:
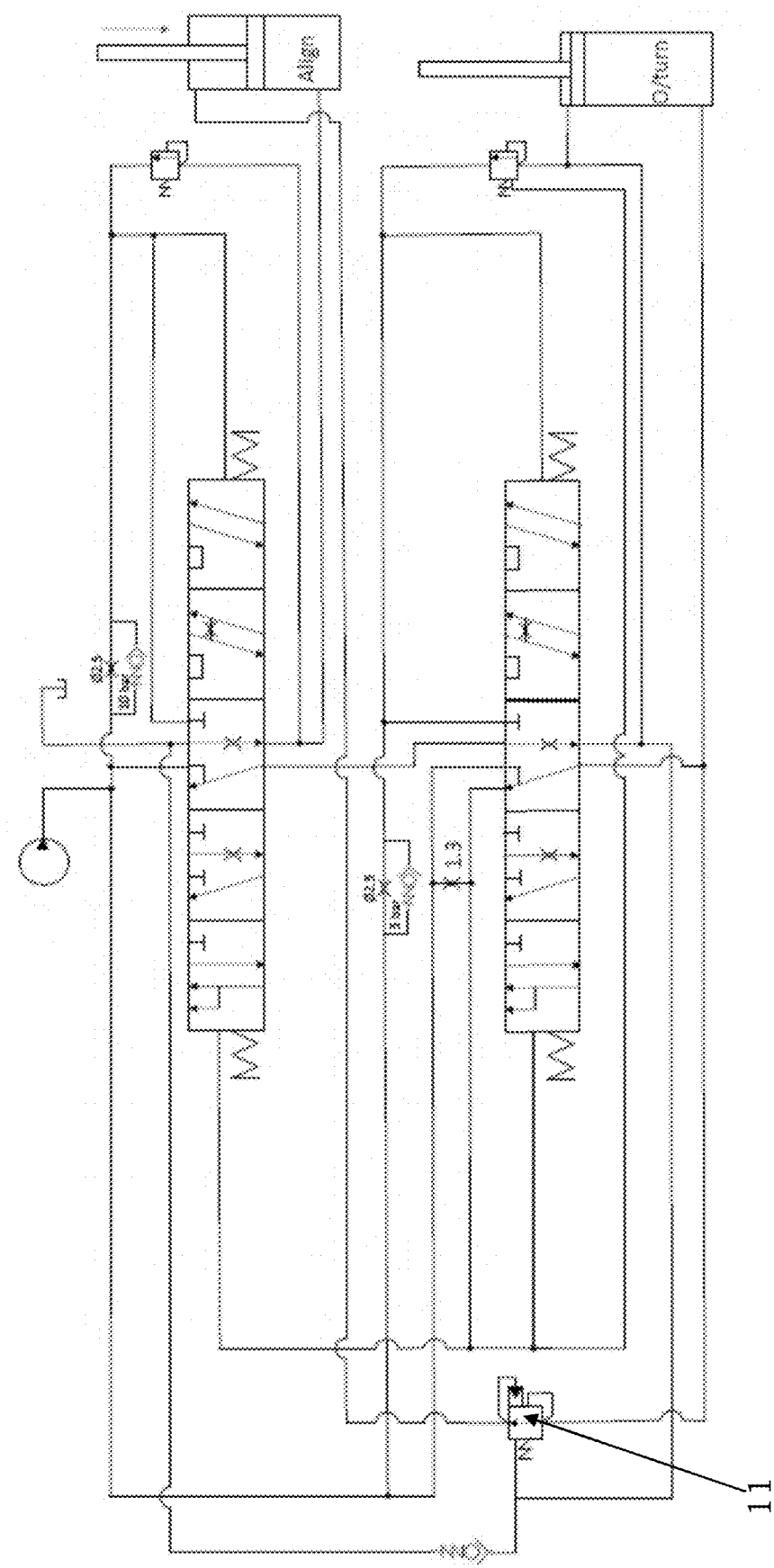
FIG. 12B shows the related detailed hydraulic circuit.

As shown in FIGS. 12A and 12B, in this second reversed configuration, when the second hydraulic cylinder 12 reaches the end of the stroke (i.e. is fully extended), the relief valve 11 opens and passes the work-fluid exiting from said second hydraulic cylinder 12 to the first hydraulic cylinder 10 to complete the operation.

More in particular, when the valve structure 1 is used in the second reversed configuration and the overturning cylinder reaches the end of the stroke and is completely out, the valve 11 opens and the flow passes to the rod chamber 10b of the alignment cylinder 10 to bring the plough to the proper working position.

Figure 13:
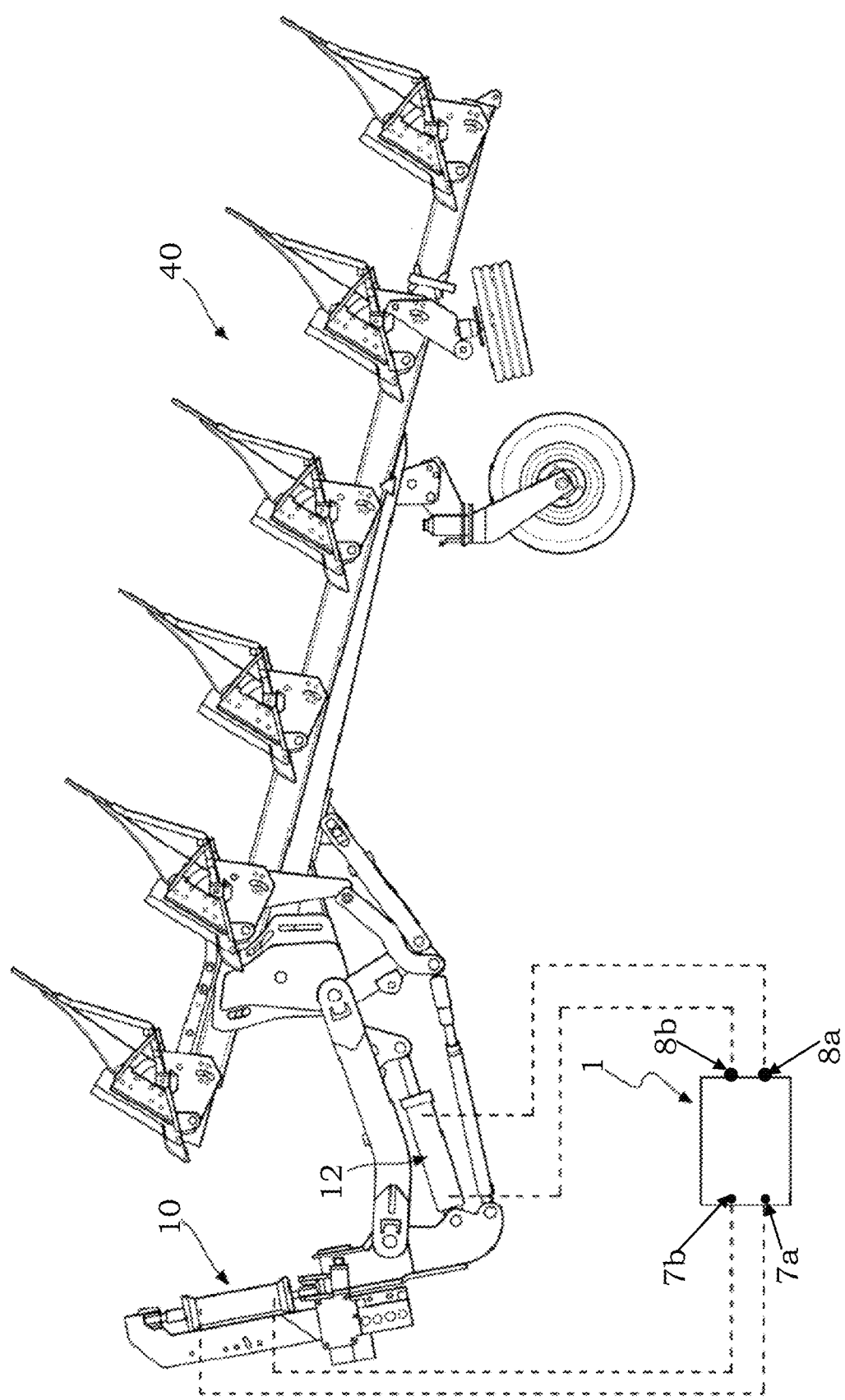
FIG. 13 is a side elevation view of a reversible plough, which is driven by the valve structure of the present disclosure.

Finally, FIG. 13 is a side elevation view of a reversible plough driven by the valve structure 1 of the present disclosure, said plough being indicated with the reference number 40. The plough 40 is equipped with the abovementioned cylinders 10 and 12, whose chambers are connected to ports the 7a, 7b, 8a, and 8b of the valve structure, as disclosed above.

In conclusion, the present disclosure provides a valve structure for driving the hydraulic cylinders of a reversible plough to obtain the automatic oil backflow and therefore the automatic reversal of the movement of said cylinders. The alignment cylinder and the overturning cylinder work in parallel. First the alignment cylinder starts lining up the load, and then the overturning cylinder starts rotating the plough. Once it passed the standoff position (i.e. 90°), the movement of the cylinders is inverted. The proper working sequence is ensured by the presence of two moving spools whose relative position determines a particular flow path of the work-fluid: therefore, a particular relative position of the spools corresponds to a particular step in the working sequence. The relative position of the spools is determined by a suitably designed hydraulic circuit, which is configured to control the work-fluid flow and pressure at specific locations of the valve structure for moving the spools, wherein the specific working sequence is controlled by the presence of relief valves in the hydraulic circuit whose opening or closure determines a specific flow path and thus the execution of a particular step in the working sequence. The presence of a check valve arranged between the pump/tank and the overturning cylinder enables a safe reverse operation of the plough.

Advantageously according to the present disclosure, a reliable actuation valve structure for the rotation and alignment of reversible plows is provided, this valve structure allowing to control, in sequence, the alignment cylinder and the overturning cylinder, also ensuring the reverse operation of the plough. The steps of the working sequence are executed automatically due to the proper arrangement of the hydraulic components. In fact, the valve structure comprises hydraulic components configured to control the relative displacement of the spools to automatically control the movement of the cylinders.

Suitably, a check valve then enables the fluid to flow in the second reversed configuration of the plough. In particular, the reverse operation is possible thanks to the check valve in the return path, allowing a larger number of applications of this valve structure. This reverse operation is very useful, for example for maintenance of the plough tools, and is achieved in very simple and effective way.

Moreover, the presence of check valves in parallel with the restrictors reduces the excessive pressure drop which is caused by the cylinder return flows passing through said restrictors.

The disclosed valve structure has low production cost and it is easy to manufacture.

The proposed solution thus advantageously solves the problems of the prior art.

From the foregoing it will be appreciated that, although specific embodiments of the disclosure have been described herein for purposes of illustration, various modifications may be made without deviating from the spirit and scope of the disclosure, all included in the protection scope as defined by the appended claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A valve structure for driving reversible ploughs, the valve structure comprising:
   a first port adapted to be in fluid communication with a pump in a first configuration of a plough and adapted to be in fluid communication with a tank in a second reversed configuration of the plough, and a second port adapted to be in fluid communication with the tank in the first configuration of the plough and adapted to be in fluid communication with the pump in the second reversed configuration of the plough;
   a body which includes a first seat and a second seat;
   a first interconnection port for the connection of said valve structure to a first chamber of a first hydraulic cylinder for longitudinally aligning the plough, and a second interconnection port for the connection to a second chamber of said first hydraulic cylinder;
   a third interconnection port for the connection of said valve structure to a first chamber of a second hydraulic cylinder for reversing the plough, and a fourth interconnection port for the connection to a second chamber of said second hydraulic cylinder; and
   a hydraulic sequencing circuit comprising:
   a first spool slidingly housed in the first seat, and a second spool slidingly housed in the second seat, said first spool and second spool being configured to control a work-fluid passage between the pump, the first seat, the second seat, the first hydraulic cylinder, the second hydraulic cylinder, and the tank in order to control the actuation of said first hydraulic cylinder and said second hydraulic cylinder according to a work sequence;
   a relief valve adapted to be in fluid communication with the first cylinder and with the second cylinder, said relief valve being configured to determine at least part of said work sequence;
   at least a first connection duct and a second connection duct configured to connect portions of the first seat and the second seat to each other;
   a third connection duct adapted to connect the first port to the second hydraulic cylinder; and
   a check valve arranged in the third connection duct and configured to allow a work-fluid to flow from the second hydraulic cylinder to the tank in the second reversed configuration of the plough and to block the work-fluid in the first configuration of the plough,
   wherein the hydraulic sequencing circuit is configured such that, in the first configuration:
   when the work-fluid is fed to the first port, the first spool and the second spool are at an initial operating position such that the fluid is supplied via the first interconnection port into the first chamber of an alignment cylinder to extend said first hydraulic cylinder;
   when the first hydraulic cylinder is fully extended and no work-fluid is discharged from the second chamber thereof, the first spool and the second spool are displaced relative to each other so that the work-fluid is supplied via the fourth interconnection port into the second chamber of the second hydraulic cylinder, retracting said second hydraulic cylinder;
   when the second hydraulic cylinder reaches an end of the stroke and no work-fluid is discharged from the first chamber thereof, the first spool and the second spool are displaced relative to each other so that the work-fluid from the pump is supplied via the third interconnection port into the first chamber of the second hydraulic cylinder, extending said second hydraulic cylinder; and
   when the second hydraulic cylinder reaches a second end of the stroke and no work-fluid is discharged from the second chamber thereof, the work-fluid from the pump is supplied via the second interconnection port into the second chamber of the first hydraulic cylinder, retracting said first hydraulic cylinder to complete the alignment of the plough,
   wherein the hydraulic sequencing circuit is further configured such that, in the second configuration, when the work-fluid is fed to the second port, it is supplied into the first chamber of the second hydraulic cylinder, wherein in this step of the second configuration only the overturning cylinder moves and then the work-fluid exiting from the second chamber passes through the third connection duct via the check valve and then returns to the tank;
   wherein when the second hydraulic cylinder reaches an end of the stroke, the relief valve opens and passes the work-fluid exiting from said second hydraulic cylinder to the first hydraulic cylinder.

2. The valve structure according to claim 1, wherein the hydraulic sequencing circuit is configured such that, in the first configuration:
   when the work-fluid is fed to the first port, the first spool and the second spool are at the initial operating position such that said work-fluid passes at least through the first spool and the first interconnection port to be supplied into the first chamber of the alignment cylinder, the fluid from the second chamber of the first hydraulic cylinder flowing through the second interconnection port, the relief valve, the first connection duct, and then returning to the tank;
   when the first hydraulic cylinder is fully extended and no work-fluid is discharged from the second chamber thereof, the first spool and the second spool are displaced relative to each other so that the work-fluid is allowed to pass via the second connection duct from the first spool to the second spool and then is supplied to the second chamber of the second hydraulic cylinder via the fourth interconnection port;

when the second hydraulic cylinder reaches an end of the stroke and no work-fluid is discharged from the first chamber thereof, the first spool and the second spool are displaced relative to each other so that the work-fluid from the pump is allowed to pass, through the second connection duct, from the first spool to the second spool and then is supplied to the first chamber of the second hydraulic cylinder via the third interconnection port; and when the second hydraulic cylinder reaches a second end of the stroke and no work-fluid is discharged from the second chamber thereof, the work-fluid from the pump (P) is allowed to pass through the first spool, the second spool, the relief valve and then is supplied to the second chamber of the first hydraulic cylinder via the second interconnection port.

3. The valve structure according to claim 1, comprising a first restrictor at the first spool, said first restrictor being arranged and configured so that, in the first configuration when the first spool and the second spool are at the initial operating position, the work-fluid from the pump passes through said first restrictor in said first spool before entering the first chamber of the first hydraulic cylinder.

4. The valve structure according to claim 3, comprising a second restrictor arranged in parallel to the first connection duct and configured to cause a pressure drop of the work-fluid passing therethrough and to cause a pressure increase in portions of the first seat and of the second seat in fluid connection with said first connection duct, the first spool and the second spool being configured to be moved from their initial operating position by the work-fluid in said portions in such a way that the relative position of said first spool and said second spool enables the work-fluid from the pump to pass through the first spool toward the first chamber of the first hydraulic cylinder without passing through the first restrictor.

5. The valve structure according to claim 4, wherein the first seat comprises a plurality of containment chambers arranged side by side, and the second seat comprises a plurality of corresponding containment chambers arranged side by side.

6. The valve structure according to claim 5, wherein the containment chambers of the first seat include a first end containment chamber and a second end containment chamber opposed to each other along a longitudinal axis of said first seat, and the containment chambers of the second seat include a first end containment chamber and a second end containment chamber opposed to each other along a longitudinal axis of said second seat, the first connection duct being arranged between the first end containment chamber of the first seat and the corresponding first end containment chamber of the second seat, said first end containment chambers of the first seat and of the second seat being the portions of said first seat and of said second seat adapted to house the pressure fluid for moving the first spool and the second spool from their initial operating position.

7. The valve structure according to claim 6, wherein the first seat comprises a central containment chamber and intermediate containment chambers arranged between the end containment chambers and the central containment chamber, and the second seat comprises a central containment chamber and intermediate containment chambers arranged between the end containment chambers and the central containment chamber, the second connection duct being arranged between one of the intermediate containment chambers of the first seat and the central containment chamber of the second seat.

8. The valve structure according to claim 7, wherein the first spool comprises two housing seats at the opposite end thereof, and the second spool comprises two housing seats at the opposite end thereof, said seats housing spring members for controlling the movement of said first spool and said second spool.

9. The valve structure according to claim 8, wherein the housing seats of the first spool are configured to receive the work-fluid from the end containment chambers of the first seat, and the housing seats of the second spool are configured to receive the work-fluid from the end containment chambers of the second seat.

10. The valve structure according to claim 6, further comprising a third restrictor which is arranged in the flow path between the second port and the first seat and is configured to cause a pressure drop of the work-fluid passing therethrough and to cause a pressure increase in a portion of the first seat in fluid connection with said third restrictor, the first spool being configured to be moved by the work-fluid in said portion in an opposite direction with respect to the motion caused by the second restrictor, enabling the work-fluid to flow from the first spool to the second spool, and wherein the portion of the first seat in fluid connection with the third restrictor and housing the pressurized work-fluid is the second end containment chamber of the first seat, said third restrictor being configured in such a way that the pressure of the work-fluid in said second end containment chamber is increased to cause the movement of the first spool.

11. The valve structure according to claim 6, further comprising a fourth restrictor which is arranged between the second port and the second seat and configured to cause a pressure drop of the work-fluid passing therethrough and to cause a pressure increase in a portion of the second seat in fluid connection with said fourth restrictor, the second spool being configured to be moved by the work-fluid in said portion in an opposite direction than the motion caused by the second restrictor to allow the work-fluid to flow from the pump to the first chamber of the second alignment cylinder, and wherein the portion of the second seat in fluid connection with the fourth restrictor and housing the pressurized work-fluid is the second end containment chamber of the second seat, the fourth restrictor being configured in such a way that the pressure of the work-fluid in said second end containment chamber is increased to cause the movement of the second spool.

12. The valve structure according to claim 10, further comprising a check valve arranged in parallel to the third restrictor and configured to allow the passage of the return flow for pressure values ranging from 2 to 10 bar.

13. The valve structure according to claim 11, further comprising a check valve arranged in parallel to the fourth restrictor and configured to allow the passage of return flow for pressure values ranging from 2 to 10 bar.

14. The valve structure according to claim 1, wherein the relief valve has a secondary area configured in such a way that, in the first configuration, the work-fluid which is discharged from the second chamber of the first hydraulic cylinder flows through the second interconnection port and then from an outlet to an inlet of said relief valve, and wherein, in the first configuration when the second hydraulic cylinder reaches a second end of the stroke and no work-fluid is discharged from the second chamber thereof, the pressure of the work-fluid is such that the relief valve is opened al lowing fluid passage from the inlet to the outlet thereof, said secondary area of said relief valve being configured so that the pressure in the second chamber of the first hydraulic cylinder holds said relief valve opened.

15. The valve structure according to claim 1, comprising:
a second relief valve arranged in the return path between the first chamber of the first hydraulic cylinder and the second port, said relief valve being configured such that, in the first configuration, when the first hydraulic cylinder reaches the end of the stroke and no fluid is displaced from the second chamber, it is in an open state; and
a third relief valve arranged in the return path between the second chamber of the second hydraulic cylinder and the second port, said relief valve being configured such that, in the first configuration, when the second hydraulic cylinder reaches the end of the stroke and no fluid is discharged from the first chamber thereof, it is in an open state.

16. The valve structure according to claim 1, wherein the first spool comprises a notch formed thereon and configured to provide a proper timing to allow said first spool to maintain the position allowing, in the first configuration, the work-fluid to flow from the pump, through the first spool, the second spool, and to be supplied to the second hydraulic cylinder to perform a rotation of the plough, and wherein the second spool comprises a notch configured to provide the proper timing to allow said second spool to maintain the position allowing, in the first configuration, the work-fluid to flow from the pump, through the first spool, the second spool, the relief valve, and to be supplied to the first hydraulic cylinder to complete the alignment of the plough.

17. The valve structure according to claim 12, further comprising a check valve arranged in parallel to the third restrictor and configured to allow the passage of the return flow for pressure values of 8 bar.

18. The valve structure according to claim 13, further comprising a check valve arranged in parallel to the fourth restrictor and configured to allow the passage of return flow for pressure values of 4 bar.

* * * * *